US007706917B1

(12) United States Patent
Chiappetta et al.

(10) Patent No.: US 7,706,917 B1
(45) Date of Patent: Apr. 27, 2010

(54) CELESTIAL NAVIGATION SYSTEM FOR AN AUTONOMOUS ROBOT

(75) Inventors: Mark Joseph Chiappetta, Chelmsford, MA (US); James Paul Frankel, Arlington, MA (US)

(73) Assignee: iRobot Corporation, Bedford, MA (US)

( * ) Notice: Subject to any disclaimer, the term of this patent is extended or adjusted under 35 U.S.C. 154(b) by 1158 days.

(21) Appl. No.: 11/176,048

(22) Filed: Jul. 7, 2005

Related U.S. Application Data

(60) Provisional application No. 60/586,046, filed on Jul. 7, 2004.

(51) Int. Cl.
*G06F 19/00* (2006.01)

(52) U.S. Cl. .................. 700/245; 701/200; 701/207; 701/221; 701/300; 701/301; 700/247; 700/258

(58) Field of Classification Search .......... 701/200–225
See application file for complete search history.

(56) References Cited

U.S. PATENT DOCUMENTS

| 3,375,375 | A | 3/1968 | Abbey et al. |
|---|---|---|---|
| 3,457,575 | A | 7/1969 | Bienek |
| 3,550,714 | A | 12/1970 | Bellinger |
| 3,674,316 | A | 7/1972 | De Brey |
| 3,937,174 | A | 2/1976 | Haaga |
| 3,989,311 | A | 11/1976 | De Brey |
| 4,012,681 | A | 3/1977 | Finger et al. |
| 4,099,284 | A | 7/1978 | Shinozaki et al. |
| 4,119,900 | A | 10/1978 | Kremnitz |
| 4,175,892 | A | 11/1979 | De Brey |
| 4,209,254 | A | 6/1980 | Reymond et al. |
| 4,306,329 | A | 12/1981 | Yokoi |
| 4,328,545 | A | 5/1982 | Halsall et al. |
| 4,367,403 | A | 1/1983 | Miller |
| 4,369,543 | A | 1/1983 | Chen et al. |
| 4,401,909 | A | 8/1983 | Gorsek |
| 4,513,469 | A | 4/1985 | Godfrey et al. |
| 4,534,637 | A | 8/1985 | Suzuki et al. |

(Continued)

FOREIGN PATENT DOCUMENTS

DE 3536907 4/1986

(Continued)

OTHER PUBLICATIONS

Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.

(Continued)

*Primary Examiner*—Khoi Tran
*Assistant Examiner*—Bhavesh V Amin
(74) *Attorney, Agent, or Firm*—Fish & Richardson P.C.

(57) ABSTRACT

A navigational control system for an autonomous robot includes a transmitter subsystem having a stationary emitter for emitting at least one signal. An autonomous robot operating within a working area utilizes a receiving subsystem to detect the emitted signal. The receiver subsystem has a receiver for detecting the emitted signal emitted by the emitter and a processor for determining a relative location of the robot within the working area upon the receiver detecting the signal.

35 Claims, 19 Drawing Sheets

U.S. PATENT DOCUMENTS

| | | | |
|---|---|---|---|
| 4,556,313 A | 12/1985 | Miller et al. | |
| 4,575,211 A | 3/1986 | Matsumura et al. | |
| 4,601,082 A | 7/1986 | Kurz | |
| 4,626,995 A | 12/1986 | Lofgren et al. | |
| 4,638,445 A | 1/1987 | Mattaboni | |
| 4,649,504 A | 3/1987 | Krouglicof et al. | |
| 4,652,917 A | 3/1987 | Miller | |
| 4,660,969 A | 4/1987 | Sorimachi et al. | |
| 4,674,048 A | 6/1987 | Okumura | |
| 4,679,152 A * | 7/1987 | Perdue | 701/23 |
| 4,691,101 A * | 9/1987 | Leonard | 250/231.16 |
| 4,700,301 A | 10/1987 | Dyke | |
| 4,700,427 A | 10/1987 | Knepper | |
| 4,733,430 A | 3/1988 | Westergren | |
| 4,733,431 A | 3/1988 | Martin | |
| 4,756,049 A | 7/1988 | Uehara | |
| 4,777,416 A | 10/1988 | George, II et al. | |
| 4,811,228 A | 3/1989 | Hyyppa | |
| 4,815,157 A | 3/1989 | Tsuchiya | |
| 4,817,000 A | 3/1989 | Eberhardt | |
| 4,829,626 A | 5/1989 | Harkonen et al. | |
| 4,854,000 A | 8/1989 | Takimoto | |
| 4,858,132 A | 8/1989 | Holmquist | |
| 4,867,570 A | 9/1989 | Sorimachi et al. | |
| 4,887,415 A | 12/1989 | Martin | |
| 4,891,762 A | 1/1990 | Chotiros | |
| 4,893,025 A | 1/1990 | Lee | |
| 4,901,394 A | 2/1990 | Nakamura et al. | |
| 4,905,151 A | 2/1990 | Weiman et al. | |
| 4,912,643 A | 3/1990 | Beirne | |
| 4,918,441 A | 4/1990 | Bohman | |
| 4,919,224 A | 4/1990 | Shyu et al. | |
| 4,933,864 A | 6/1990 | Evans et al. | |
| 4,954,962 A | 9/1990 | Evans, Jr. et al. | |
| 4,955,714 A | 9/1990 | Stotler et al. | |
| 4,962,453 A | 10/1990 | Pong et al. | |
| 4,977,618 A | 12/1990 | Allen | |
| 5,001,635 A * | 3/1991 | Yasutomi et al. | 701/26 |
| 5,002,145 A | 3/1991 | Waqkaumi et al. | |
| 5,005,128 A | 4/1991 | Robins et al. | |
| 5,020,186 A | 6/1991 | Lessig et al. | |
| 5,024,529 A | 6/1991 | Svetkoff et al. | |
| 5,040,116 A | 8/1991 | Evans, Jr. et al. | |
| 5,049,802 A | 9/1991 | Mintus et al. | |
| 5,084,934 A | 2/1992 | Lessig et al. | |
| 5,086,535 A | 2/1992 | Grossmeyer et al. | |
| 5,093,955 A | 3/1992 | Blehert et al. | |
| 5,105,502 A | 4/1992 | Takashima | |
| 5,109,566 A | 5/1992 | Kobayashi et al. | |
| 5,115,538 A | 5/1992 | Cochran et al. | |
| 5,136,750 A | 8/1992 | Takashima et al. | |
| 5,142,985 A | 9/1992 | Stearns et al. | |
| 5,155,684 A | 10/1992 | Burke et al. | |
| 5,163,202 A | 11/1992 | Kawakami et al. | |
| 5,164,579 A | 11/1992 | Pryor et al. | |
| 5,165,064 A | 11/1992 | Mattaboni | |
| 5,204,814 A | 4/1993 | Noonan et al. | |
| 5,208,521 A | 5/1993 | Aoyama | |
| 5,216,777 A | 6/1993 | Moro et al. | |
| 5,227,985 A | 7/1993 | DeMenthon | |
| 5,233,682 A | 8/1993 | Abe et al. | |
| 5,251,358 A | 10/1993 | Moro et al. | |
| 5,261,139 A | 11/1993 | Lewis | |
| 5,279,672 A | 1/1994 | Betker et al. | |
| 5,284,522 A | 2/1994 | Kobayashi et al. | |
| 5,293,955 A | 3/1994 | Lee | |
| 5,315,227 A | 5/1994 | Pierson et al. | |
| 5,319,827 A | 6/1994 | Yang | |
| 5,321,614 A | 6/1994 | Ashworth | |
| 5,324,948 A | 6/1994 | Dudar et al. | |
| 5,341,186 A | 8/1994 | Kato | |
| 5,341,540 A | 8/1994 | Soupert et al. | |
| 5,353,224 A | 10/1994 | Lee et al. | |
| 5,369,347 A | 11/1994 | Yoo | |
| 5,369,838 A | 12/1994 | Wood et al. | |
| 5,410,479 A | 4/1995 | Coker | |
| 5,440,216 A | 8/1995 | Kim | |
| 5,444,965 A | 8/1995 | Colens | |
| 5,446,356 A | 8/1995 | Kim | |
| 5,453,931 A * | 9/1995 | Watts, Jr. | 701/23 |
| 5,454,129 A | 10/1995 | Kell | |
| 5,467,273 A | 11/1995 | Faibish et al. | |
| 5,497,529 A | 3/1996 | Boesi | |
| 5,498,948 A | 3/1996 | Bruni et al. | |
| 5,507,067 A | 4/1996 | Hoekstra et al. | |
| 5,510,893 A | 4/1996 | Suzuki | |
| 5,515,572 A | 5/1996 | Hoekstra et al. | |
| 5,534,762 A | 7/1996 | Kim | |
| 5,537,017 A | 7/1996 | Feiten et al. | |
| 5,539,953 A | 7/1996 | Kurz | |
| 5,542,146 A | 8/1996 | Hoekstra et al. | |
| 5,548,511 A | 8/1996 | Bancroft | |
| 5,553,349 A | 9/1996 | Kilstrom et al. | |
| 5,555,587 A | 9/1996 | Guha | |
| 5,560,077 A | 10/1996 | Crotchett | |
| 5,568,589 A | 10/1996 | Hwang | |
| 5,608,944 A | 3/1997 | Gordon | |
| 5,613,261 A | 3/1997 | Kawakami et al. | |
| 5,621,291 A | 4/1997 | Lee | |
| 5,634,237 A | 6/1997 | Paranjpe | |
| 5,634,239 A | 6/1997 | Tuvin et al. | |
| 5,636,402 A | 6/1997 | Kubo et al. | |
| 5,650,702 A | 7/1997 | Azumi | |
| 5,652,489 A | 7/1997 | Kawakami | |
| 5,682,313 A | 10/1997 | Edlund et al. | |
| 5,682,839 A | 11/1997 | Grimsley et al. | |
| 5,698,861 A | 12/1997 | Oh | |
| 5,709,007 A | 1/1998 | Chiang | |
| 5,717,484 A | 2/1998 | Hamaguchi et al. | |
| 5,735,959 A | 4/1998 | Kubo et al. | |
| 5,745,235 A | 4/1998 | Vercammen et al. | |
| 5,767,960 A | 6/1998 | Orman | |
| 5,781,960 A | 7/1998 | Kilstrom et al. | |
| 5,786,602 A | 7/1998 | Pryor et al. | |
| 5,787,545 A | 8/1998 | Colens | |
| 5,794,297 A | 8/1998 | Muta | |
| 5,812,267 A | 9/1998 | Everett, Jr. et al. | |
| 5,814,808 A | 9/1998 | Takada et al. | |
| 5,815,880 A | 10/1998 | Nakanishi | |
| 5,815,884 A | 10/1998 | Imamura et al. | |
| 5,819,008 A | 10/1998 | Asama et al. | |
| 5,825,981 A | 10/1998 | Matsuda | |
| 5,828,770 A | 10/1998 | Leis et al. | |
| 5,839,156 A | 11/1998 | Park et al. | |
| 5,841,259 A | 11/1998 | Kim et al. | |
| 5,867,800 A | 2/1999 | Leif | |
| 5,910,700 A | 6/1999 | Crotzer | |
| 5,924,167 A | 7/1999 | Wright et al. | |
| 5,926,909 A | 7/1999 | McGee | |
| 5,933,913 A | 8/1999 | Wright et al. | |
| 5,935,179 A | 8/1999 | Kleiner et al. | |
| 5,940,927 A | 8/1999 | Haegermarck et al. | |
| 5,940,930 A | 8/1999 | Oh et al. | |
| 5,942,869 A | 8/1999 | Katou et al. | |
| 5,959,423 A | 9/1999 | Nakanishi et al. | |
| 5,968,281 A | 10/1999 | Wright et al. | |
| 5,974,348 A | 10/1999 | Rocks | |
| 5,974,365 A | 10/1999 | Mitchell | |
| 5,983,448 A | 11/1999 | Wright et al. | |
| 5,991,951 A | 11/1999 | Kubo et al. | |
| 5,998,953 A | 12/1999 | Nakamura et al. | |
| 6,000,088 A | 12/1999 | Wright et al. | |
| 6,009,358 A | 12/1999 | Angott et al. | |
| 6,023,813 A | 2/2000 | Thatcher et al. | |

| | | | |
|---|---|---|---|
| 6,023,814 A | 2/2000 | Imamura | |
| 6,030,465 A | 2/2000 | Marcussen et al. | |
| 6,038,501 A | 3/2000 | Kawakami | |
| 6,041,472 A | 3/2000 | Kasen et al. | |
| 6,046,800 A | 4/2000 | Ohtomo et al. | |
| 6,055,702 A | 5/2000 | Imamura et al. | |
| 6,061,868 A | 5/2000 | Moritsch et al. | |
| 6,065,182 A | 5/2000 | Wright et al. | |
| 6,076,025 A | 6/2000 | Ueno et al. | |
| 6,076,226 A | 6/2000 | Reed | |
| 6,076,227 A | 6/2000 | Schallig et al. | |
| 6,081,257 A | 6/2000 | Zeller | |
| 6,101,671 A | 8/2000 | Wright et al. | |
| 6,108,076 A | 8/2000 | Hanseder | |
| 6,108,597 A | 8/2000 | Kirchner et al. | |
| 6,112,143 A | 8/2000 | Allen et al. | |
| 6,124,694 A | 9/2000 | Bancroft et al. | |
| 6,125,498 A | 10/2000 | Roberts et al. | |
| 6,131,237 A | 10/2000 | Kasper et al. | |
| 6,142,252 A | 11/2000 | Kinto et al. | |
| 6,146,278 A | 11/2000 | Kobayashi | |
| 6,154,279 A | 11/2000 | Thayer | |
| 6,160,479 A | 12/2000 | Ahlen et al. | |
| 6,167,587 B1 | 1/2001 | Kasper et al. | |
| 6,216,307 B1 | 4/2001 | Kaleta et al. | |
| 6,226,830 B1 | 5/2001 | Hendriks et al. | |
| 6,240,342 B1 | 5/2001 | Fiegert et al. | |
| 6,243,913 B1 | 6/2001 | Frank et al. | |
| 6,255,793 B1 | 7/2001 | Peless et al. | |
| 6,259,979 B1 | 7/2001 | Holmquist | |
| 6,261,379 B1 | 7/2001 | Conrad et al. | |
| 6,263,989 B1 | 7/2001 | Won | |
| 6,285,778 B1 | 9/2001 | Nakajima et al. | |
| 6,285,930 B1 | 9/2001 | Dickson et al. | |
| 6,300,737 B1 | 10/2001 | Bergvall et al. | |
| 6,323,570 B1 | 11/2001 | Nishimura et al. | |
| 6,327,741 B1 | 12/2001 | Reed | |
| 6,339,735 B1 | 1/2002 | Peless et al. | |
| 6,362,875 B1 | 3/2002 | Burkley | |
| 6,370,453 B2 | 4/2002 | Sommer | |
| 6,374,155 B1 | 4/2002 | Wallach et al. | |
| 6,381,802 B2 | 5/2002 | Park | |
| 6,385,515 B1 | 5/2002 | Dickson et al. | |
| 6,389,329 B1 | 5/2002 | Colens | |
| 6,400,048 B1 | 6/2002 | Nishimura et al. | |
| 6,408,226 B1 | 6/2002 | Byrne et al. | |
| 6,427,285 B1 | 8/2002 | Leggatt et al. | |
| 6,431,296 B1 | 8/2002 | Won | |
| 6,437,465 B1 | 8/2002 | Nishimura et al. | |
| 6,438,456 B1 | 8/2002 | Feddema et al. | |
| 6,438,793 B1 | 8/2002 | Miner et al. | |
| 6,442,476 B1 | 8/2002 | Poropat | |
| 6,446,302 B1 | 9/2002 | Kasper et al. | |
| D464,091 S | 10/2002 | Christianson | |
| 6,457,206 B1 | 10/2002 | Judson | |
| 6,459,955 B1 | 10/2002 | Bartsch et al. | |
| 6,463,368 B1 | 10/2002 | Feiten et al. | |
| 6,465,982 B1 | 10/2002 | Bergvall et al. | |
| 6,473,167 B1 | 10/2002 | Odell | |
| 6,481,515 B1 | 11/2002 | Kirkpatrick et al. | |
| 6,490,539 B1 | 12/2002 | Dickson et al. | |
| 6,493,612 B1 * | 12/2002 | Bisset et al. | 701/23 |
| 6,493,613 B2 | 12/2002 | Peless et al. | |
| 6,496,754 B2 | 12/2002 | Song et al. | |
| 6,496,755 B2 | 12/2002 | Wallach et al. | |
| 6,502,657 B2 | 1/2003 | Kerrebrock et al. | |
| 6,507,773 B2 | 1/2003 | Parker et al. | |
| 6,525,509 B1 | 2/2003 | Petersson et al. | |
| D471,243 S | 3/2003 | Cioffi et al. | |
| 6,532,404 B2 | 3/2003 | Colens | |
| 6,535,793 B2 | 3/2003 | Allard | |
| 6,540,607 B2 | 4/2003 | Mokris et al. | |
| 6,548,982 B1 | 4/2003 | Papanikolopoulos et al. | |
| 6,556,722 B1 | 4/2003 | Russell et al. | |
| 6,563,130 B2 | 5/2003 | Dworkowski et al. | |
| 6,571,415 B2 | 6/2003 | Gerber et al. | |
| 6,571,422 B1 | 6/2003 | Gordon et al. | |
| 6,572,711 B2 | 6/2003 | Sclafani et al. | |
| 6,574,536 B1 | 6/2003 | Kawagoe et al. | |
| 6,580,246 B2 | 6/2003 | Jacobs | |
| 6,584,376 B1 | 6/2003 | Kommer | |
| 6,586,908 B2 | 7/2003 | Petersson et al. | |
| 6,587,573 B1 | 7/2003 | Stam et al. | |
| 6,594,551 B2 | 7/2003 | McKinney, Jr. et al. | |
| 6,594,844 B2 | 7/2003 | Jones | |
| 6,601,265 B1 | 8/2003 | Burlington | |
| 6,604,022 B2 | 8/2003 | Parker et al. | |
| 6,605,156 B1 | 8/2003 | Clark et al. | |
| 6,611,120 B2 | 8/2003 | Song et al. | |
| 6,611,734 B2 | 8/2003 | Parker et al. | |
| 6,611,738 B2 | 8/2003 | Ruffner | |
| 6,615,108 B1 | 9/2003 | Peless et al. | |
| 6,615,885 B1 | 9/2003 | Ohm | |
| 6,629,028 B2 | 9/2003 | Paromtchik et al. | |
| 6,639,659 B2 | 10/2003 | Granger | |
| 6,658,325 B2 | 12/2003 | Zweig | |
| 6,658,692 B2 | 12/2003 | Lenkiewicz et al. | |
| 6,661,239 B1 | 12/2003 | Ozick | |
| 6,662,889 B2 | 12/2003 | De Fazio et al. | |
| 6,668,951 B2 | 12/2003 | Won | |
| 6,671,592 B1 | 12/2003 | Bisset et al. | |
| 6,687,571 B1 | 2/2004 | Byrne et al. | |
| 6,690,134 B1 * | 2/2004 | Jones et al. | 318/567 |
| 6,697,147 B2 | 2/2004 | Ko et al. | |
| 6,737,591 B1 | 5/2004 | Lapstun et al. | |
| 6,741,054 B2 | 5/2004 | Koselka et al. | |
| 6,741,364 B2 | 5/2004 | Lange et al. | |
| 6,748,297 B2 | 6/2004 | Song et al. | |
| 6,764,373 B1 | 7/2004 | Osawa et al. | |
| 6,769,004 B2 | 7/2004 | Barrett | |
| 6,781,338 B2 | 8/2004 | Jones et al. | |
| 6,809,490 B2 | 10/2004 | Jones et al. | |
| 6,845,297 B2 | 1/2005 | Allard | |
| 6,860,206 B1 | 3/2005 | Rudakevych et al. | |
| 6,870,792 B2 | 3/2005 | Chiappetta | |
| 6,883,201 B2 | 4/2005 | Jones et al. | |
| 6,906,702 B1 | 6/2005 | Tanaka et al. | |
| 6,917,854 B2 | 7/2005 | Bayer | |
| 6,929,548 B2 | 8/2005 | Wang | |
| D510,066 S | 9/2005 | Hickey et al. | |
| 6,940,291 B1 | 9/2005 | Ozick | |
| 6,956,348 B2 | 10/2005 | Landry et al. | |
| 6,980,229 B1 | 12/2005 | Ebersole et al. | |
| 7,032,469 B2 | 4/2006 | Bailey | |
| 7,142,198 B2 | 11/2006 | Lee | |
| 7,148,458 B2 | 12/2006 | Schell et al. | |
| 2001/0013929 A1 | 8/2001 | Torsten | |
| 2001/0037163 A1 | 11/2001 | Allard | |
| 2001/0047231 A1 | 11/2001 | Peless et al. | |
| 2001/0047895 A1 | 12/2001 | De Fazio et al. | |
| 2002/0011367 A1 | 1/2002 | Kolesnik | |
| 2002/0011813 A1 | 1/2002 | Koselka et al. | |
| 2002/0016649 A1 | 2/2002 | Jones | |
| 2002/0021219 A1 | 2/2002 | Edwards | |
| 2002/0027652 A1 | 3/2002 | Paromtchik et al. | |
| 2002/0036779 A1 | 3/2002 | Kiyoi et al. | |
| 2002/0104963 A1 | 8/2002 | Mancevski | |
| 2002/0113973 A1 | 8/2002 | Ge | |
| 2002/0120364 A1 | 8/2002 | Colens | |
| 2002/0156556 A1 | 10/2002 | Ruffner | |
| 2002/0159051 A1 | 10/2002 | Guo | |
| 2002/0173877 A1 | 11/2002 | Zweig | |
| 2002/0189871 A1 | 12/2002 | Won | |
| 2003/0024986 A1 | 2/2003 | Mazz et al. | |
| 2003/0025472 A1 | 2/2003 | Jones et al. | |
| 2003/0058262 A1 | 3/2003 | Sato et al. | |

| Publication/Patent No. | Date | Inventor | | Country | Number | Date |
|---|---|---|---|---|---|---|
| 2003/0060928 A1 | 3/2003 | Abramson et al. | | JP | 59226909 | 12/1984 |
| 2003/0120389 A1 | 6/2003 | Abramson et al. | | JP | 60089213 A | 5/1985 |
| 2003/0124312 A1 | 7/2003 | Autumn | | JP | 60211510 | 10/1985 |
| 2003/0126352 A1 | 7/2003 | Barrett | | JP | 61023221 | 1/1986 |
| 2003/0137268 A1 | 7/2003 | Papanikolopoulos et al. | | JP | 61097712 | 5/1986 |
| 2003/0146384 A1 | 8/2003 | Logsdon et al. | | JP | 62070709 | 4/1987 |
| 2003/0192144 A1 | 10/2003 | Song et al. | | JP | 62-120510 | 6/1987 |
| 2003/0193657 A1 | 10/2003 | Uomori et al. | | JP | 62-154008 | 7/1987 |
| 2003/0216834 A1 | 11/2003 | Allard | | JP | 63-183032 | 7/1988 |
| 2003/0221114 A1 | 11/2003 | Hino et al. | | JP | 63-241610 | 10/1988 |
| 2003/0233177 A1 | 12/2003 | Johnson et al. | | JP | 2-6312 | 1/1990 |
| 2003/0233870 A1 | 12/2003 | Mancevski | | JP | 03 051023 | 3/1991 |
| 2003/0233930 A1 | 12/2003 | Ozick | | JP | 3201903 | 9/1991 |
| 2004/0020000 A1 | 2/2004 | Jones | | JP | 4019586 | 1/1992 |
| 2004/0030448 A1 | 2/2004 | Solomon | | JP | 4074285 | 3/1992 |
| 2004/0030449 A1 | 2/2004 | Solomon | | JP | 5040519 | 2/1993 |
| 2004/0030450 A1 | 2/2004 | Solomon | | JP | 5150827 | 6/1993 |
| 2004/0030451 A1 | 2/2004 | Solomon | | JP | 5150829 | 6/1993 |
| 2004/0030570 A1 | 2/2004 | Solomon | | JP | 05257527 A | 10/1993 |
| 2004/0030571 A1 | 2/2004 | Solomon | | JP | 05285861 A1 | 11/1993 |
| 2004/0068351 A1 | 4/2004 | Solomon | | JP | 6-3251 | 1/1994 |
| 2004/0068415 A1 | 4/2004 | Solomon | | JP | 06-038912 | 2/1994 |
| 2004/0068416 A1 | 4/2004 | Solomon | | JP | 6137828 | 5/1994 |
| 2004/0076324 A1 | 4/2004 | Burl et al. | | JP | 06-327598 | 11/1994 |
| 2004/0088079 A1 | 5/2004 | Lavarec et al. | | JP | 07-129239 | 5/1995 |
| 2004/0111184 A1 | 6/2004 | Chiappetta et al. | | JP | 7270518 | 10/1995 |
| 2004/0134336 A1 | 7/2004 | Solomon | | JP | 7-295636 | 11/1995 |
| 2004/0134337 A1 | 7/2004 | Solomon | | JP | 8-16776 | 1/1996 |
| 2004/0156541 A1 | 8/2004 | Jeon et al. | | JP | 3197758 | 3/1996 |
| 2004/0158357 A1 | 8/2004 | Lee et al. | | JP | 08-089451 | 4/1996 |
| 2004/0196451 A1 | 10/2004 | Aoyama | | JP | 08-152916 | 6/1996 |
| 2004/0200505 A1 | 10/2004 | Taylor et al. | | JP | 2555263 | 8/1996 |
| 2004/0204792 A1 | 10/2004 | Taylor et al. | | JP | 9-43901 | 2/1997 |
| 2004/0211444 A1 | 10/2004 | Taylor et al. | | JP | 9044240 | 2/1997 |
| 2004/0236468 A1 | 11/2004 | Taylor et al. | | JP | 9145309 | 6/1997 |
| 2004/0244138 A1 | 12/2004 | Taylor et al. | | JP | 8-393 | 7/1997 |
| 2005/0000543 A1 | 1/2005 | Taylor et al. | | JP | 9-179625 | 7/1997 |
| 2005/0010331 A1 | 1/2005 | Taylor et al. | | JP | 10177414 | 6/1998 |
| 2005/0156562 A1 | 7/2005 | Cohen et al. | | JP | 11-508810 | 8/1999 |
| 2005/0211880 A1 | 9/2005 | Schell et al. | | JP | 11-510935 | 9/1999 |
| 2005/0212929 A1 | 9/2005 | Schell et al. | | JP | 11-162454 | 12/2000 |
| 2005/0213082 A1 | 9/2005 | DiBernardo et al. | | JP | 2001-258807 | 9/2001 |
| 2005/0213109 A1 | 9/2005 | Schell et al. | | JP | 2001-275908 | 10/2001 |
| 2006/0044546 A1 | 3/2006 | Lewin et al. | | JP | 2001-525567 | 12/2001 |
| 2006/0119839 A1 | 6/2006 | Bertin et al. | | JP | 2002-78650 | 3/2002 |
| | | | | JP | 2002-204768 | 7/2002 |
| FOREIGN PATENT DOCUMENTS | | | | JP | 2002-532178 | 10/2002 |
| DE | 4338841 A1 | 5/1995 | | JP | 3356170 | 10/2002 |
| DK | 338988 | 12/1998 | | JP | 2002-323925 | 11/2002 |
| EP | 0265542 A1 | 10/1986 | | JP | 3375843 | 11/2002 |
| EP | 0281085 A2 | 3/1988 | | JP | 2002-355206 | 12/2002 |
| EP | 0294101 A | 12/1988 | | JP | 2002-360471 | 12/2002 |
| EP | 0358628 A2 | 9/1989 | | JP | 2002-360482 | 12/2002 |
| EP | 0358628 A3 | 9/1989 | | JP | 2003-10076 | 1/2003 |
| EP | 0479273 A | 1/1992 | | JP | 2003-5296 | 2/2003 |
| EP | 0554978 A2 | 1/1993 | | JP | 2003-036116 | 2/2003 |
| EP | 0 615 719 | 9/1994 | | JP | 2003-38401 | 2/2003 |
| EP | 0 792 726 | 9/1997 | | JP | 2003-38402 | 2/2003 |
| EP | 1 331 537 | 7/2003 | | JP | 2003-505127 | 2/2003 |
| FR | 2601443 A | 1/1998 | | JP | 2003-061882 | 3/2003 |
| FR | 2 828 589 | 8/2001 | | JP | 2003-241836 | 8/2003 |
| GB | 2267360 | 12/1993 | | JP | 2003-310489 | 11/2003 |
| GB | 2 283 838 | 5/1995 | | JP | 2004198330 | 7/2004 |
| GB | 2284957 A | 6/1995 | | JP | 2006227673 | 8/2006 |
| GB | 2300082 | 10/1996 | | WO | WO 95/26512 | 10/1995 |
| JP | 57064217 | 4/1982 | | WO | WO 95/30887 | 11/1995 |
| JP | 59094005 | 5/1984 | | WO | WO 96/17258 | 6/1996 |
| JP | 59099308 A | 6/1984 | | WO | WO 97/15224 | 5/1997 |
| JP | 59112311 A | 6/1984 | | WO | WO 97/40734 | 11/1997 |
| JP | 59164973 A | 9/1984 | | WO | WO 97/41451 | 11/1997 |
| JP | 59184917 A | 10/1984 | | WO | WO 98/53456 | 11/1998 |
| JP | 59212924 | 12/1984 | | WO | WO 99/16078 | 4/1999 |
| | | | | WO | WO 99/28800 | 6/1999 |

| | | |
|---|---|---|
| WO | WO 99/38056 | 7/1999 |
| WO | WO 99/38237 | 7/1999 |
| WO | WO 99/43250 | 9/1999 |
| WO | WO 99/59042 | 11/1999 |
| WO | WO 00/04430 | 1/2000 |
| WO | WO 00/36962 | 6/2000 |
| WO | WO 00/38026 | 6/2000 |
| WO | WO 00/38029 | 6/2000 |
| WO | WO 00/78410 | 12/2000 |
| WO | WO 01/06904 | 2/2001 |
| WO | WO 02/39864 | 5/2002 |
| WO | WO 02/39868 | 5/2002 |
| WO | WO 02/058527 | 8/2002 |
| WO | WO 02/067744 | 9/2002 |
| WO | WO 02/067745 | 9/2002 |
| WO | WO 02/074150 | 9/2002 |
| WO | WO 02/075350 | 9/2002 |
| WO | WO 02/075356 | 9/2002 |
| WO | WO 02/075469 | 9/2002 |
| WO | WO 02/075470 | 9/2002 |
| WO | WO 02/101477 | 12/2002 |
| WO | WO 03/026474 | 4/2003 |
| WO | WO 03/040546 | 5/2003 |
| WO | WO 03/040845 | 5/2003 |
| WO | WO 03/040846 | 5/2003 |
| WO | WO 2004/006034 | 1/2004 |
| WO | WO 2005/098475 | 10/2005 |
| WO | WO 2005/098476 | 10/2005 |

OTHER PUBLICATIONS eVac Robotic Vacuum S1727 Instruction Manual, Sharper Image Corp, Copyright 2004, 16 pgs.

Facts on the Trilobite webpage: "http://trilobiteelectroluxse/presskit_en/nodel1335asp?print=yes&pressID=" accessed Dec. 12, 2003 (2 pages).

Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.

Kärcher Product Manual Download webpage: "http://wwwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004 (16 pages).

Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.

Kärcher RoboCleaner RC 3000 Product Details webpages: "http://wwwrobocleanerde/english/screen3html" through "... screen6html" accessed Dec. 12, 2003 (4 pages).

Koolvac Robotic Vacuum Cleaner Owner's Manual, Koolatron, Undated, 26 pgs.

Schofield, Monica, "Neither Master nor Slave" A Practical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.

NorthStar Low-Cost, Indoor Localization, Evolution robotics, Powering Intelligent Products, 2 pgs.

Put Your Roomba . . . On "Automatic" webpages: "http://www.acomputeredge.com/roomba," accessed Apr. 20, 2005, 5 pgs.

Put Your Roomba . . . On "Automatic" Roomba Timer> Timed Cleaning-Floorvac Robotic Vacuum webpages: http://cgi.ebay.com/ws/eBayISAPI.dll?ViewItem&category=43575198387&rd=1, accessed Apr. 20, 2005, 5 pgs.

Friendly Robotics Robotic Vacuum RV400-The Robot Store website: http://www.therobotstore.com/s.nl/sc.9/category,-109/it.A/id.43/.f, accessed Apr. 20, 2005, 5 pgs.

Zoombot Remote Controlled Vaccum-RV-500 NEW Roomba 2, website: http://cgi.ebay.com/ws/eBayISAPI.dll?ViewItem&category=43526&item=4373497618&rd=1, accessed Apr. 20, 2005, 7 pgs.

Everyday Robots, website: http://www.everydayrobots.com/index.php?option=content&task=view&id=9, accessed Apr. 20, 2005, 7 pgs.

Robot Review Samsung Robot Vacuum (VC-RP30W), website: http://www.onrobo.com/reviews/At_Home/Vacuun_Cleaners/on00vcrp30rosam/index.htm, accessed Mar. 18, 2005, 11 pgs.

Robotic Vacuum Cleaner-Blue, website: http://www.sharperimage.com/us/en/catalog/productview.jhtml?sku=S1727BLU, accessed Mar. 18, 2005, 3 pgs.

Hitachi: News release: The home cleaning robot of the autonomous movement type (experimental machine) is developed, website: http://www.i4u.com/japanreleases/hitachirobot.htm., accessed Mar. 18, 2005, 5 pgs.

Karcher USA, RC3000 Robotic Cleaner, website: http://www.karcher-usa.com/showproducts.php?op=view_prod&param1=143&param2=&param3=, accessed Mar. 18, 2005, 6 pgs.

Electrolux designed for the well-lived home, website: http://www.electroluxusa.com/node57.as[?currentURL=node142.asp%3F, acessed Mar. 18, 2005, 5 pgs.

RoboMaid Sweeps Your Floors So You Won't Have To, the Official Site, website: http://www.thereobomaid.com/, acessed Mar. 18, 2005, 2 pgs.

Wired News: Robot Vacs Are in the House, website: http://www.wired.com/news/print/0,1294,59237,00.html, accessed Mar. 18, 2005, 6 pgs.

Becker C. et al., "Reliable navigation using landmarks" Proceedings of the Int'l Conf. on Robotics and Automation, May 21-27, 1995, New York, IEEE, US vol. 1, May 21, 1995 Requested Copy From Library.

Image Based Absolute Positioning System for Mobile Robot Navigation, Yun, JaeMu; Lyu, EunTae; Lee JangMyung; Department of Electronics Engineering, Pusan National University, SSPR&SPR 2006, LNCS 4109, p. 261-269, 2006, Springer-Verlag Berlin Heidelberg.

Documentation in Northstar, Ma J., CIT PhD Candidate.

Real-Time Dynamic Visual Tracking Using PSD Sensors and Extended Trapezoidal Motion Planning, Nam, Soo-Hyuk; Oh, Se-Young; Applied Intelligence 10, 53-70 (1999), Kluwer Academic Publishers.

Robust Positioning a Mobile Robot with Active Beacon Sensors, Yun, JaeMu; Kim SungBu; Lee JangMyung; Department of Electronics Engineering, Pusan National University, KES 2006, Part I, LNAI 4251, pp. 890-897, 2006, Springer-Verlag Berlin Heidelberg 2006.

Laser Triangulation fundamental uncertainty in distance measurement, Dorsch, Rainer G.; Hausler, Gerd; Herrmann, Jurgen M.; Applied Optics, vol. 33, No. 7, Mar. 1, 1994, 1307-1314.

A Beacon Navigation Method for Autonomous Vehicles, McGillem, Clare D.; Rappaport, Theodore S.; IEEE Transactions on Vehicular Technology, vol. 38, No. 3, Aug. 1989, pp. 132-139.

A Novel Mobile Robot Localization Based on Vision, Yi, Zhang; Yuan, Luo; SPIE vol. 6279, 27th International Congress on High-Speed Photography and Photonics (2007).

A simple map-based localization strategy using range measurements, Moore, Kevin L.; Kutiyanawala, Aliasgar; Chandrasekharan, Madhumita; Proceedings of SPIE vol. 5804, Unmanned Ground Vehicle Technology VII (2005).

Adaptive position estimation for an automated guided vehicle, Lapin, Brett; SPIE vol. 1831, Moblie Robots VII, May 1993, pp. 82-94.

An Intelligent map-building system for indoor mobile robot using low cost photo sensors, Jeong, Tae cheol; Hyun, Woong keun; SPIE vol. 6042 (2005), Control Systems and Robotics.

Environment Model for Mobile Robots Indoor Navigation, Roth-Tabak, Yuval; Weymouth, Terry E.; SPIE vol. 1388, Mobile Robots V (1990), pp. 453-463.

HelpMate™ Autonomous Mobile Robot Navigation System, King, Steven J.; Weiman, Cark F.R.; SPIE vol. 1388, Mobile Robots V, Mar. 1991, pp. 190-198.

High-performance visual servoing for robot end-point control, Corke, Peter I.; SPIE vol. 2056, Intelligent Robots and Computer Vision XII (1993), pp. 378-387.

Mobile Robot Localization with Sparse Landmarks, Fairfield, Nathaniel; Maxwell, Bruce; Proceedings of SPIE vol. 4573 (2002), Mobile Robotics XVI, pp. 148-155.

Mobile Robot Navigation Sensors, Benayad-Cherif, Faycal; Maddox, James; Muller, Lon; SPIE vol. 1831; Mobile Robots VII, May 19923, pp. 378-387.

Model based vision system for mobile robot position estimation, D'Orazio, T.; Capozzo, L.; Ianigro, M.; Distante, A.; SPIE vol. 2058, Mobile Robots VIII (1993), pp. 38-49.

Self-Location for Indoor Navigation of Autonomous Vehicles, Stella, E.; Circirelli, G.; Branca, A.; Distante, A., SPIE Conference on Enhanced and Synthetic Vision (Apr. 1998), SPIE vol. 3364, pp. 298-302.

The accuracy of point light target coordinate determination by dissectoral tracking system, Martishevcky, Yuri V.; SPIE Vo. 2591 (1995), pp. 25-30.

Visual servoing based on ellipse features, Rives, P.; Michel, H.; SPIE vol. 2056, Intelligent Robots and Computer Vision XII (1993), pp. 356-367.

Mobile Robot Localization in Indoor Environment, Dulimarta, Hansye S.; Jain, Anil K.; Pattern Recognition, vol. 30, No. 1, pp. 99-111, 1997, Published by Elsevier Science Ltd.

Mobile Robot Navigation Using Artificial Landmarks, Lin, Cheng-Chih; Tummala, R. Lai; Journal of Robotic Systems 14 (2), 93-106 (1997), published by John Wiley & Sons, Inc., pp. 93-106.

Navigation and guidance in interstellar space, Hoag, David G.; Wrigley, Walter; Acta Astronautica, vol. 2, pp. 513-533, Pergamon Press (1975).

Optimal landmark selection for triangulation of robot position, Madsen, Claus B.; Andersen, Claus S.; Robotics and Autonomous Systems 23 (1998), pp. 277-292, published by Elsevier.

Using a Structured Beacon for Cooperative Position Estimation, Bison, P.; Chemello, G.; Sossai, C.; Trainito, G.; Robotics and Autonomous Systems 29 (1999), pp. 33-40, published by Elsevier.

Accuracy in Position Estimation of Mobile Robots Based on Coded Infrared Signal Transmission, Eren, H.; Fung, Chun Che; Nakazato, Yokihiro; (1995), IEEE, pp. 548-551.

Active Global Localization for a Mobile Robot Using Multiple Hypothesis Tracking, Jensfelt, P.; Kristensen, S.; IEEE Transactions on Robotics and Automation, vol. 17, No. 5, (Oct. 2001), pp. 748-760.

AMOR—An Autonomous Mobile Robot Navigation System, Blaasvaer, H.; Pirjanian, P.; Chistensen, H.I.; Systems, Man and Cybernetics (Oct. 1994), "Humans, Information and Technology," vol. 3, pp. 2266-2271.

An Algorithm for Maze Searching With Azimuth Input, Lumelsky, V.; Tiwari, S.; IEEE (1994); pp. 111-116.

An Efficient Algorithm to Find a Shortest Path for a Car-Like Robot, Desaulniers, G.; Soumis, F.; IEEE Transactions on Robotics and Automation, Vo. 11, No. 6 (Dec. 1995), pp. 819-828.

Challenges for Standards for Consumer Robotics, Pirjanian, P.; IEEE Workshop on Advanced Robotics and its Social Impacts (Jun. 2005), pp. 260-264.

Core Technologies for Service Robotics, Karlsson, N.; Munich, M.E.; Goncalves, L.; Ostrowski, J.; DiBernardo, E.; Pirjanian, P.; IEEE/RSJ International Conference on Intelligent Robots and Systems (2004), vol. 3, pp. 2979-2984, Proceedings of the IEEE.

Efficient Tracking of 3 D—Robot Positions by Dynamic Triangulation, Favre-Bulle, B.; Prenninger, J.; Eitzinger, C.; IEEE Instrumentation and Measurement Technology Conference (May 1998), vol. 1, pp. 446-449.

Exploiting Process Integration and Composition in the Context of Active Vision, Fayman, J.A.; Pirjanian, P.; Christensen, H.I.; Rivlin, E.; IEEE Transactions on Systems, Man and Cybernetics, vol. 29, Issue. 1; (Feb. 1999), pp. 73-86.

Implementation of an Active Optical Range Sensor Using Laser Slit for In-Door Intelligent Mobile Robot, Yuta, Shin'ichi; Suzuki, S.; Saito, Y.; Sigeki, I.; IEEE/RSJ International Workshop on Intelligent Robots and Systems (Nov. 1991), pp. 415-420.

Infra-red Location System for Navigation of Autonomous Vehicles, McGillem, C.; Rappaport, T.; IEEE (1988), pp. 1236-1238.

Learning Visual Landmarks for Pose Estimation, Sim, R.; Dudek, G.; Proceedings of the 1999 IEEE International Conference on Robotics and Automation (May 1999), pp. 1972-1978.

Localization of a Mobile Robot Using the Image of a Moving Object, Lee, Jang Myung; Lee, Son K.; Choi, J.W.; Han, S.H.; Lee, Man Hyung; Industrial Electronics, IEEE Transactions on, vol. 50, Issue. 3; (Jun. 2003), pp. 612-619.

Mobile Robot Localization by Tracking Geometric Beacons, Leonard, J.; Durrant-Whyte, H.; IEEE Transactions on Robotics and Automation, vol. 7, No. 3 (Jun. 1991), pp. 376-382.

Mobile Robot Localization using Landmarks, Betke, Margrit; Gurvits, Leonid; IEEEXplore, pp. 135-142.

Models for Map Building and Navigation, Penna, M.A.; Wu, J.; IEEE Transactions on Systems, Man and Cybernetics; vol. 23, No. 5; (Sep./Oct. 1993), 1276-1301.

Navigation System based on Ceiling Landmark Recognition for Autonomous Mobile Robot, Fukuda, T.; Ito, S.; Oota, N.; Arai, F.; Abe, Y.; Tanaka, K.; Tanaka, Y.; Proceedings of the IECON, International Conference on Industrial Electronics, Control and Instrumentation (Nov. 1993), vol. 3, pp. 1466-1471.

Operation of mobile robots in a structured infrared environment, Eren, H.; Fung, C.C.; Newcombe, D.; Goh, J.; IEEE Instrumentation and Measurement Technology Conference (May 1997), pp. 20-25.

Optical Sensing for Robot Perception and Localization, Yamamoto, Y.; Pirjanian, P.; Munich, M.; DiBernardo, E.; Goncalves, L.; Ostrowski, J.; Karlsson, N.; IEEE Workshop on Advanced Robotics and its Social Impacts (Jun. 2005), pp. 14-17.

Optimal Mobile Robot Pose Estimation Using Geometrical Maps, Borges, G.A.; Aldon, M.; IEEE Transactions on Robotics and Automation, vol. 18, No. 1 (Feb. 2002), pp. 87-94.

Optomechatronic System for Position Detection of a Mobile Mini-Robot, Nitu, C.I.; Gramescu, B.S.; Comeaga, C.D.P.; Trufasu, A.O.; IEEE Transactions on Industrial Electronics (Aug. 2005), vol. 52, Issue. 4; pp. 969-973.

Planning of Landmark Measurement for the Navigation of a Mobile Robot, Komoriya, K; Oyama, E.; Tani, K.; Intelligent Robots and Systems (Jul. 1992), Proceedings of the IEEE, vol. 2, pp. 1476-1481.

Pose Estimation from Corresponding Point Data, Haralick, R.; Joo, H.; Lee, C.; Zhuang, X.; Vaidya, V.; Kim, Man Bae; IEEE Transactions on Systems, Man, and Cybernetics, vol. 19, No. 6, (Nov./Dec. 1989), pp. 1426-1446.

Position Estimation of Mobile Robots With Internal and External Sensors Using Uncertainty Evolution Technique, Watanabe, Y.; Yuta, S.; IEEE (1990), pp. 2011-2016.

Real Time Position and Pose Tracking Method of Moving Object Using Visual Servo System, Takio, A.; Kondo, K.; Kobashi, S.; Hata, Y.; IEEE International Midwest Symposium on Circuits and Systems (2004), pp. 167-170.

Reliable Reaction, Pirjanian, P.; Multisensor Fusion and Integration for Intelligent Systems (Dec. 1996), pp. 158-165.

Robot Localization Using a Computer Vision Sextant, Cozman, F.; Krotkov, E.; IEEE International Conference on Robotics and Automation (May 1995), vol. 1, pp. 106-111.

Robot Motion Planning in a Changing, Partially Predictable Environment, LaValle, S.; Sharma, R.; IEEE International Symposium on Intelligent Control (Aug. 1994), pp. 261-266.

Robust Vision Based Localization by Combining an Image Retrieval System with Monte Carlo Localization Wolf, J.: Burgard, W.; Burkhardt, H.; Robotics, IEEE Transactions on, (Apr. 2005), vol. 21, Issue. 2, pp. 208-216.

The Localization Problem for Mobile Robots, Kleinberg, J.M.; IEEE (1994), pp. 521-531.

Theoretical Methods for Planning and Control in Mobile Robotics, Christensen, H.I.; Pirjanian, P.; First International Conference on Knowledge-Based Intelligent Electronic Systems (May 1997), vol. 1, pp. 81-86.

Triangulation-Based Fusion of Sonar Data with Application in Robot Pose Tracking, Wijk, O.; Christensen, H.I.; IEEE Transactions on Robotics and Automation. V. 16, No. 6, (Dec. 2000), pp. 740-752.

Visual Measurement of Orientation Using Ceiling Features, Lang, S.; Roth, D.; Green, D.A.; Burhanpurkar, V.; Proceedingins in IEEE Instrumentation and Measurement Technology Conference (May 1994), pp. 552-555.

Visual Servoing for Fast Mobile Robot Adaptive Estimation of Kinematic Parameters, Monteiro, D.; Jouvencel, B.; International Conference on Industrial Electronics, Control and Instrumentation (Nov. 1993), vol. 3, pp. 1588-1593.

Experimental System for Real-Time Motion Estimation, Kolodko, J.; Vlacic, L.; International Conference on Advanced Intelligent Mechatronics (Jul. 2003), vol. 2, pp. 981-986.

A Neural Network Based Real-Time Robot Tracking Controller Using Position Sensitive Detectors, Park, Hyoung-Gweon; Oh, Se-Young; IEEE International Conference on Neural Networks, IEEE World Congress on Computational Intelligence, vol. 5; (Jul. 1994), pp. 2754-2758.

A camera-projector system for robot positioning by visual servoing, Pages, J.; Collewet, C.; Chaumette, F.; Salvi, J.; Conference on Computer Vision and Pattern Recognition (Jun. 2006); pp. 2-2.

Robust decoupled visual servoing based on structured light, Pages, J.; Collewet, C.; Chaumette, F.; Salvi, J.; IEEE/RSJ International Conference on Intelligent Robots and Systems (Aug. 2005), pp. 2399-2404.

Development of a Visual Object Localization Module for Mobile Robots, Sahin, E.; Gaudiano, P.; Third European Workshop on Advanced Mobile Robots (Sep. 1999), pp. 65-72.

Image based robot navigation in 3D environments, Remazeilles, Anthony; Chaumette, Francois; Gros, Patrick; SPIE vol. 6052, Optomechatronic Systems Control (2005).

Smart PSD-array for sheet of light range imaging, de Bakker, Michiel; Verbeek, Piet. W.; Steenvoorden, Gijs K.; Proceedings of SPIE vol. 3965 (2000), Sensors and Camera Systems for Scientific, Industrial and Digital Photography Applications, pp. 21-32.

Localization and Identification of Visual Landmarks, Knights, Dan; Lanza, Jeff; JCSC 16, 4 (May 2001), pp. 312-313.

Localizing a Robot with Minimum Travel, Dudek, Gregory; Romanik, Kathleen; Whitesides, Sue; Siam J. Comput., vol. 27, No. 2, pp. 583-604 (Apr. 1998).

Self Localization in Virtual Environments using Visual Angles, Kuhl, Scott A.; Sutherland, Karen T.; ACM, 2004, pp. 472-475.

Self-Configuring Localization System: Design and Experimental Evaluation, Bulusu, Nirupama; Heidemann, John; Estrin, Deborah; Tran, Tommy; ACM Transactions on Embedded Computing Systems, vol. 3, No. 1, Feb. 2004, pp. 24-60.

Autonomous navigation, Robert C. Michelson, AccessScience@McGraw-Hill, http://www.accessscience.com, DOI 10.1036/1097-8542.YB000130, last modified: Dec. 5, 2000.

Robot boldly goes where no man can, Watts, David; The Times, Tuesday Jan. 29, 1985, p. 18, Finance and Industry section.

A mobile robot employing insect strategies for navigation, Lambrinos, D., Moller, R., Labhart, T., Pfeifer, R., Wehner, R., Department of Computer Science, University of Zurich, Department of Zoology, University of Zurich.

Lightweight rovers for Mars Science and Exploration and Sample Return, Schenker P.S., Sword L.F., Ganino A.J., Bickler D.B., Hickey G.S., Brown D.K., Baumgartner E.T., Matthies L.H., Wilcox B.H., Balch T., Aghazarian H., Garrett M.S.; Jet Propulsion Laboratory, CIT, pp. 1-11.

Optimizing plane-to-plane positioning tasks by image based visual servoing and structured light, Pages J., Collewet C., Chaumette F., Salvi J.; IEEE Transactions on Robotics, vol. 22, No. 5, Oct. 2006, pp. 1000-1010.

Biomimetic Robot Navigation, Franz M., Mallot H.,; Max-Planck -Institut for Biological, Robotics and Autonomous Systems 30 (2000) 133-153.

A localization method based on two omnidirectional perception systems cooperation, Clerentin A., Delahoche L., Pegard C., Brassart Gracsy E.; Research Group on Command Systems.

On Aspects of Indoor Localization, Linde H., dissertation, Aug. 2006, pp. 1-139.

Navigation by the Stars, Barker, B.; powerpoint.

Optical Guidance System for Multiple Mobile Robots, Parmtchik I., Asama H.; The Institute of Physical and Chemical Research, Advanced Engineering Center. 2001 IEEE International Conference on Robotics and Automation.

Tracking Locations of Moving Hand-Held Displays Using Projected Light, Summet J., Sukthankar R.; GVU Center and College of Computing, Georgia Institute of Technology, Pervasive 2005, LNCS 3468, pp. 37-46 (2005).

Dynamic Visual Servo Control of Robot Manipulators Using Neural Networks, Park J.S., Oh S.Y.; Dept. of Electrical Engineering Pohang Inst. of Science and Technology, Journal of the Korean Institute of Telematics and Electronics, 29B (1992).

Low Cost Indoor Localization System for Mobile Objects without Image Processing, Salomon R., Scheider M., Wehden D.; IEEE 1-4244-0681.

StarLITE: a new artificial landmark for the navigation of mobile robots, Chae H., Lee J., Yu W., Doh N.L.; Intelligent Robot Division, ETRI 161 South Korea Requested From Library.

Pervasive Pose-Awareness for People, Objects, and Robots or.. Empowering Robots to Clear your Dining-Room Table, Teller S., LCS/AI, Apr. 30, 2003, 22 pgs.

Toward Optical Guidance of Mobile Robots, Paromtchik I., Hajime A.; The Institute of Physical and Chemical Research, Japan, 6 pgs.

Digital Sextant, Krotkov E., Cozman F.

Mobile Robotics 1994, Fuentes O., Karlsson J., Meira W., Rao R., Riopka T., Rosca J., Sarukkai R., Van Wie M., Zaki M., Becker T., Frank R., Miller B., Brown C.M.; University of Rochester Computer Science Department, Technical Report 588, Jun. 1995, pp. 1-44.

A hand-held optical surface scanner for environmental modeling and virtual reality, Fisher R.B., Fitzgibbon A., Gionis A., Wright M., Eggert D.; Dept. of Artificial Intelligence University of Edinburgh, pp. 1-16.

On Methods for Assistive Mobile Robots, Ronnback, S.; Lulea University of Technology Dept. of Computer Science and Electrical Engineering (2006), PhD Thesis.

Optical Tracking from User Motion to 3D Interaction, Dissertation, Vienna University of Technology, Oct. 2002, Dorfmuller-Ulhaas, K.

Robot Business, Wong, William; Jul. 26, 2006, http://www.elecdesign.com/Articles/Index.cfm?ArticleID=13114.

Development of Indoor Navigation System for a Humanoid Robot Using Multi-Sensors Integration, Lee C.H., Jeon C.W., Park C.G., Lee J.G., ION NTM 2007, Jan. 2007, pp. 798-805.

Using and Learning Vision-Based Self-Positioning for Autonomous Robot Navigation, Facchinetti C., Tiech F., and Hugli H., Proc, 3rd Int. Conf., Automation, Robotics and Computer Vision (ICARCV '94), Singapore (1994), pp. 1694-1698.

Self-Positioning Robot Navigation Using Ceiling Image Sequences, Facchinetti C., Tiech F., and Hugli H., Proc. 2nd Asian Conf. Computer Vision (ACCV '95), Singapore, (1995), pp. 814-818.

Bottom-Following for Remotely Operated Vehicles, Caccia M., Bono R., Bruzzone, G., and Veruggio G., Proc. 5th IFAC Symp., Manoeuvering and Control of Marine Craft, Aalborg, Denmark (2000), pp. 251-256.

About the Scaling Behavior of Optical Range Sensors, Hausler G., Proc. 3rd Int. Workshop Automatic Processing of Fringe Patterns, Germany (1997), pp. 147-155.

Range Imaging Based on Moving Pattern Light and Spatio-Temporal Matched Filter, Sato K., International Conference on Image Processing, vol. 1, pp. 33-36 (1996).

SIFT-ing Through Features With ViPR, Munich M.E., et al., Robotics & Automation Magazine, IEEE, vol. 13, Issue 3, Sep. 2006, pp. 72-77.

Campout: A control Architecture for Tightly Coupled Coordination of Multirobot Systems for Planetary Surface Exploration, Huntsberger T., et al., Systems, Man and Cybernetics, Part A, IEEE Transactions, vol. 33, Issue 5, Sep. 2003, pp. 550-559.

The vSLAM Algorighm for Robust Localization and Mapping, Karlsson N., et al., Robotics and Automation, 2005, ICRA 2005, Proceedings of the 2005 IEEE International Conference, Apr. 2005, pp. 24-29.

A Visual Front-end for Simultaneous Localization and Mapping, Goncalves L., et al., Robotics and Automation, 2005, ICRA 2005, Proceedings of the 2005 IEEE International Conference, Apr. 2005, pp. 44-49.

Structure From Stereo Vision Using Unsynchronized Cameras for Simultaneous Localization and Mapping, Svedman M., et al., Intelligent Robots and Systems, 2005 (IROS 2005), 2005 IEEE/RSJ International Conference, Aug. 2005, pp. 3069-3074.

ERSP: A Software Platform and Architecture for the Service Robotics Industry, Munich M.E., et al., Intelligent Robots and Systems, 2005 (IROS 2005), 2005 IEEE/RSJ International Conference, Aug. 2005, pp. 460-467.

Distributed Control for a Modular, Reconfigurable Cliff Robot, Pirjanian P., et al., Robotics and Automation, 2002, Procedings ICRA '02, IEEE International Conference, May 2002, pp. 4083-4088, vol. 4.

Mars Rover Pair Cooperatively Transporting a Long Payload, Trebi-Ollennu A., et al., Robotics and Automation, 2002, Proceedings ICRA '02, IEEE International Conference, May 2002, pp. 3136-3141.

Representation and Execution of Plan Sequences for Multi-Agent Systems, Pirjanian P., et al., Intelligent Robots and Systems, 2001, Proceedings, 2001 IEEE/RSJ International Conference, Oct.-Nov. 2001, pp. 2117-2123, vol. 4.

Multi-Robot Target Acquisition Using Multiple Objective Behavior Coordination, Pirjanian P., et al., Robotics and Automation, 2000, Proceedings, IRCA '00, IEEE International Conference, Apr. 2000, pp. 2696-2702, vol. 3.

A Decision-Theoretic Approach to Fuzzy Behavior Coordination, Pirjanian P., et al., Computational Intelligence in Robotics and Automation, 1999, CIRA '99 Proceedings, 1999 IEEE International Symposium, Nov. 1999, pp. 101-106.

Improving Task Reliability by Fusion of Redundant Homogeneous Modules Using Voting Schemes, Pirjanian P., et al., Robotics and Automation, 1997, Proceedings, 1997 IEEE International Conference, Apr. 1997, pp. 425-430, vol. 1.

Robust Vision-Based Localization for Mobile Robots Using an Image Retrieval System Based on Invariant Features, Wolf., Jr., et al., Robotics and Automation, 2002, Proceedings ICRA '02, IEEE International Conference, May 2002, pp. 359-365, vol. 1.

Autonomous 3-D Positioning of Surgical Instruments in Robotized Laparoscopic Surgery Using Visual Servoing, Krupa, A., et al., Robotics and Automation, IEEE Transactions, Oct. 2003, pp. 842-853, vol. 19, Issue 5.

Landmark-based Navigation Strategies, Andersen, C.S., et al., Proceedings of SPIE—vol. 3525, Mobile Robots XII and Intelligent Transportation Systems, Jan. 1999, pp. 170-181.

Transaction History from PAIR printed Apr. 14, 2009, for U.S. Appl. No. 10/883,319.

Transaction History from PAIR printed Apr. 14, 2009, for U.S. Appl. No. 11/090,405.

Transaction History from PAIR printed Apr. 14, 2009, for U.S. Appl. No. 11/090,432.

Transaction History from PAIR printed Apr. 14, 2009, for U.S. Appl. No. 11/090,621.

Si PIN photodiode, S5980, S5981, S5870, Multi-element photodiodes for surface mounting, Hamamatsu, Solid State Division, Cat. No. KPIN1012E02, Apr. 2001, 2 pgs.

\* cited by examiner

CELESTIAL NAVIGATION SYSTEM FOR AN AUTONOMOUS ROBOT

RELATED APPLICATIONS

This application incorporates by reference in its entirety and claims priority to U.S. patent application Ser. No. 60/586,046, entitled "Celestial Navigation System for an Autonomous Robot," filed on Jul. 7, 2004.

TECHNICAL FIELD

The present invention relates generally to robotic systems and, more specifically, to navigational systems for autonomous robots.

BACKGROUND

Automated robots and robotic devices are becoming more prevalent today and are used to perform tasks traditionally considered mundane, time-consuming, or dangerous. As the programming technology increases, so too does the demand for robotic devices that can navigate around a complex environment or working space with little or no assistance from a human operator.

Robotic devices and associated controls, navigational systems, and other related systems are being developed. For example, U.S. Pat. No. 6,594,844 discloses a Robot Obstacle Detection System, the disclosure of which is hereby incorporated by reference in its entirety. Additional robot control and navigation systems, and other related systems, are disclosed in PCT Published Patent Application No. WO 2004/025947, and in U.S. patent application Ser. Nos. 10/167,851, 10/056,804, 10/696,456, 10/661,835, 10/320,729, and 10/762,219, the disclosures of which are hereby incorporated by reference in their entireties.

Many autonomous robots navigate a working space by simply moving randomly until an obstacle is encountered. Generally, these types of robots have on-board obstacle detectors, such as bump sensors or similar devices, that register contact with an obstacle. Once contact is made, command routines typically direct the robot to move in a direction away from the obstacle. These types of systems, which are useful for obstacle avoidance, are limited in their ability to allow a robot to track its location within a room or other working environment. Other systems, often used in conjunction with the bump sensors described above, use an infrared or other detector to sense the presence of nearby walls, obstacles, or other objects, and either follow the obstacle or direct the robot away from it. These systems, however, are also limited in their ability to allow a robot to navigate effectively in a complex environment, as they allow the robot to only recognize when objects are in its immediate vicinity.

In more advanced navigational systems, a robot incorporates an infrared or other type of transmitter. This transmitter directs a series of infrared patterns in horizontal directions around the robot. These patterns are, in turn, detected by a stationary receiver, generally placed at or near a boundary of the working space, on a wall, for example. A microprocessor uses the information from the signals to calculate where in the working space the robot is located at all times; thus, the robot can truly navigate around an entire area. These types of systems, however, are best employed in working spaces where few objects are present that may interfere with the dispersed patterns of infrared signals.

These limitations of the above types of navigational systems are, at present, a hurdle to creating a highly independent autonomous robot, which can navigate in a complex environment. There is, therefore, a need for a navigational system for a robot that can allow the robot to operate autonomously within an environment that may be cluttered with a number of obstacles at or near the operational or ground level. Moreover, a navigational system that can be integrated with some or all of the above systems (the bump sensors, for example) is desirable. Such a navigational system should allow a robot to recognize where it is at all times within a working area, and learn the locations of obstacles therein.

SUMMARY OF THE INVENTION

In one aspect, the invention relates to a navigational system for an autonomous robot that includes a stationary transmitter for emitting at least two signals, the signals directed toward a surface remote from a working area, such as a wall bordering a floor (upon which a robot operates), or a ceiling located above the floor. The system also includes a receiver mounted to an autonomous robot containing various power, motive, and task-related components. The receiver detects the two signals emitted by the emitter, and a processor determines the location of the robot within the working area based upon the received signals. Generally, the signals directed to the remote surface are infrared signals, but other embodiments are also possible. The robot detects the signal energy reflected from the ceiling and, by calculating the azimuth and elevation of the signals relative to the robot, can determine its location.

In another aspect, the invention relates to a method of control for an autonomous robot including the steps of: transmitting a signal from a stationary emitter to a surface remote from a working area; detecting the signal using a receiver integral with an autonomous robot; and directing a movement of the autonomous robot within the working area, the movement based at least in part upon detection of the signal.

In yet another aspect, the invention relates to a method of control for an autonomous robot including the steps of: transmitting at least two signals from a stationary emitter to a surface remote from a working area; detecting the signals using a receiver integral with an autonomous robot; and determining a location of the autonomous robot within the working area, the location based at least in part upon detection of the signal.

In still another aspect, the invention relates to a signal transmitter for providing navigational markings for use by an autonomous robot including: a power source; and a modulated signal emitter, wherein the signal emitter sequentially emits a first coded signal and a second coded signal, the first signal and the second signal directed to a surface remote from a working area of the robot.

In still another aspect, the invention relates to a receiver for detecting emitted navigational markings, the receiver mountable to an autonomous robot, the receiver including: a lens including a plurality of photodiodes, each photodiode oriented orthogonally to each adjacent photodiode, each photodiode adapted to detect a signal reflected from a remote surface; and a processor for processing the signals received from the plurality of photodiodes, the processor including a plurality of data outputs.

In another aspect, the invention relates to a navigational control system for an autonomous robot including a transmitter subsystem having a stationary emitter for emitting at least one signal, and an autonomous robot operating within a working area, the autonomous robot having a receiving subsystem. The receiving subsystem has a receiver for detecting the signal emitted by the emitter and a processor for determining a relative location of the robot within the working area upon the receiver detecting the signal. In certain embodiments of the above aspect, the emitter includes a modulated signal emitter and may sequentially emit a first coded signal and a second coded signal. In other embodiments of this aspect, the receiver includes a plurality of photodiodes, and may include four or five photodiodes. In some embodiments, at least four photodiodes are arranged in a substantially planar orientation, and may be oriented orthogonally to each adjacent photodiode. In certain embodiments, the fifth photodiode is oriented substantially orthogonally to each of the four photodiodes. Some embodiments orient at least one of the photodiodes in a direction corresponding to a reference direction of travel of the robot.

In other embodiments of the above aspect, the processor further includes a navigational control algorithm, and may direct a movement of the robot within the working area upon the receiver detecting the signal. In certain embodiments, the emitter emits at least two signals, and may be located on a robot docking station. In certain embodiments, the signal includes light having at least one of a visible wavelength and an infrared wavelength. Alternative embodiments direct at least one signal at a surface remote from the working area.

In another aspect, the invention relates to a method of control for an autonomous robot, including the steps of transmitting a signal from a stationary emitter, detecting the signal using a receiver integral with the robot operating within a working area, and determining a relative position of the robot in the working area based at least in part on the detected signal. The method may include the step of directing a movement of the robot within the working area, the movement based at least in part upon the position of the robot. Certain embodiments may include the step of storing a position of the robot and/or the step of comparing the position of the robot to a stored position.

Other embodiments of the above aspect include the step of directing a movement of the robot within the working area, the movement based at least in part on the stored position. In certain embodiments, the relative position of the robot is based at least in part on at least one of an elevation and an azimuth of the detected signal. In other embodiments, the transmitted signal is directed to a surface remote from the working area.

BRIEF DESCRIPTION OF THE DRAWINGS

The drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
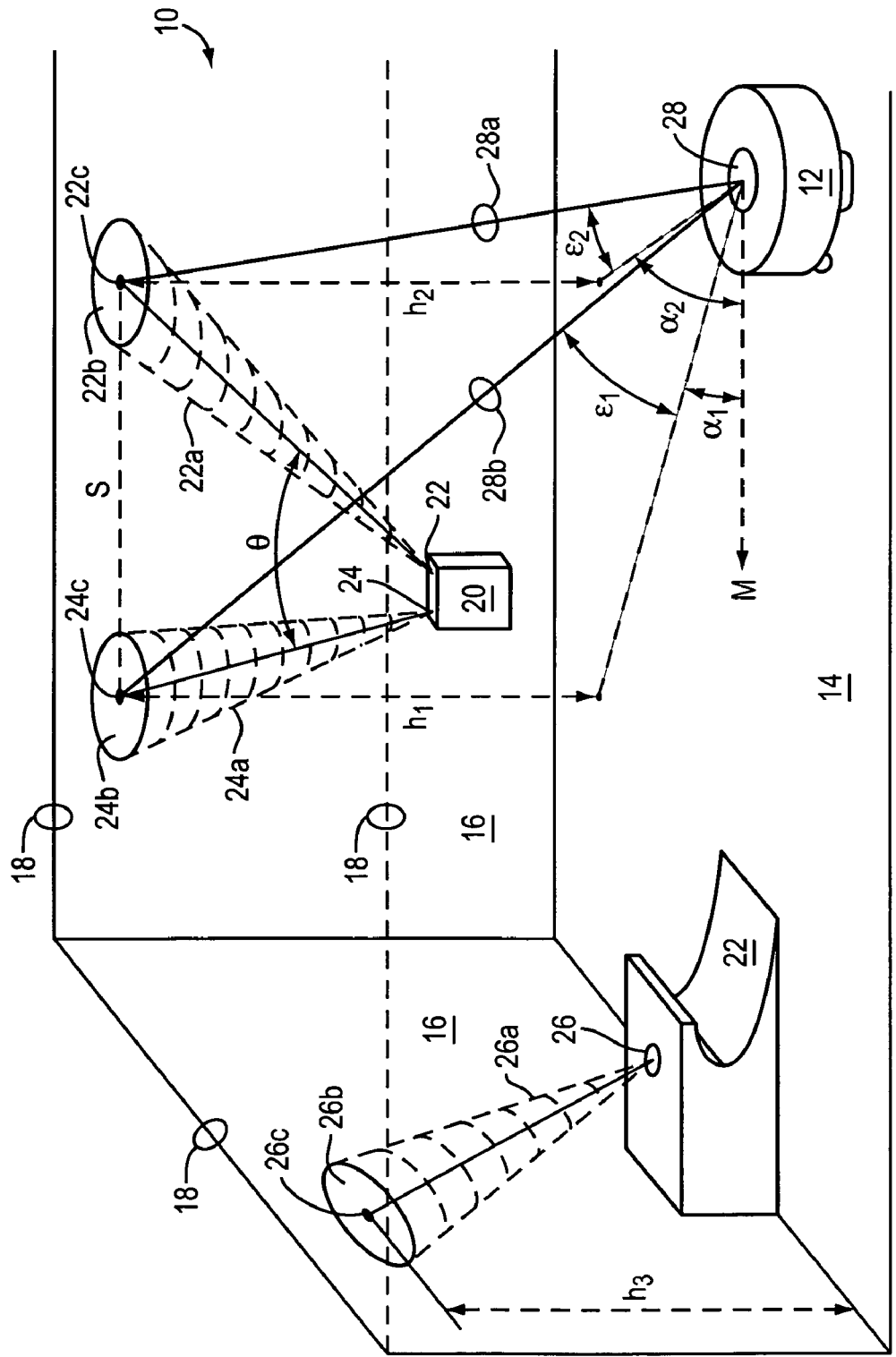
FIG. 1 is a schematic view of a navigational system for an autonomous robot in accordance with one embodiment of the invention.

FIG. 1 is a schematic view of a navigational system 10 for an autonomous robot 12 in accordance with one embodiment of the invention. The components of the system 10 include, in this embodiment, a transmitter 20, a charging or base station 22, and a robot 12 that operates in a room or other similar working area 14. In this case, the working area 14 is a floor of a room, bounded at least in part by walls 16. Borders of a ceiling 18 also intersect the walls 16 and are remote from the working area 14. The depicted transmitter 20 includes two emitters 22, 24. In this embodiment, the base station 22 may include an emitter 26 as well. In various embodiments, any combination or quantity of emitters may be used on the base station 26, or transmitter 20, or both. The robot 12 includes an on-board microprocessor, power and drive components, task-specific components (dirt sensors, vacuums, brushes, etc.), and at least one receiver, such as a infrared receiver 28. The robot 12 may also include certain buttons, switches, etc. for programming the robot, or such instructions may be directed by a remote control (not shown) or a personal computer (not shown). Depending on the application, certain components may be removed from the disclosed system 10, or other components may be added. Also, for simplicity, this disclosure will describe vacuuming as a demonstrative task of the autonomous robot 12. It will be apparent, though, that the navigation system disclosed herein has wide applications across a variety of robotic systems. For example, a robot may be used for floor waxing and polishing, floor scrubbing, ice resurfacing (as typically performed by equipment manufactured under the brand name ZAMBONI®), sweeping and vacuuming, unfinished floor sanding and stain/paint application, ice melting and snow removal, grass cutting, etc. Any number of task-specific components may be required for such duties, and may each be incorporated into the robot, as necessary.

The transmitter 20 directs at least two infrared signals 22a, 24a from emitters 22, 24 to a surface remote from the working area 14 upon which the robot 12 operates. The depicted embodiment directs the signals 22a, 24a to the ceiling 18, but it may also direct the signals 22a, 24a to a portion of a wall 16, or both. The signals 22a, 24a may be directed to any point on the remote surface, but directing the signals as high as possible above the working area 14 is generally desirable. Directing the signals to a high point allows them to be more easily detected by the robot 12, as the field of view of the robot receiver 28 is less likely to be blocked by a tall obstacle (such as a high-backed chair or tall plant). In this disclosure, the regions of contact 22b, 24b of the signals 22a, 24a on the remote surface will be referred to as "points," regardless of the size of the intersection. For example, by using a collimator in conjunction with the emitters (described below), the points of intersection 22b, 24b of the signals 22a, 22b can be a finite area with the signal strongest at approximately central points 22c, 24c. In alternative embodiments, central points 22c, 24c represent focused laser or other signals that may be used for navigation.

In one embodiment of the transmitter, the signals 22a, 24a are directed towards a ceiling 18, at two points 22c, 24c, forming a line proximate and parallel to the wall 16 upon which the transmitter 20 is located. Alternatively, and as depicted in FIG. 1, the signals 22a, 24b may be directed out away from the wall 16, at an angle of approximately 5° or more, to avoid any interference with objects such as pictures secured to or hung from the wall 16. Generally, the signals 22a, 24a are transmitted at a known angle θ between the two signals 22a, 24a; in one such embodiment, θ equals approximately 30°, but other angles are contemplated. This angle θ may be set at the time of manufacture or user-defined based on particular applications or other requirements. By setting the angle θ to a known value, the distance S between the signals 22a, 24a at the point of contact 22b, 24b with ceiling 18 may be determined, provided the heights of the ceiling $h_1$, $h_2$ at the points of contact 22b, 24b are known. Note that when used on a flat ceiling 18, as depicted, $h_1$ equals $h_2$.

In the embodiment depicted in FIG. 1, base station 22 emits signal 26a, which may serve as another or optional signal that the robot 12 may utilize. Here signal 26a is directed toward a wall 16, so that the point of contact 26b is high enough to avoid any objects that may obstruct the robot's 12 field of view. Central point 26c (or laser point) contacts the wall 16 at height $h_3$.

As the robot 12 moves within a working area 14, it detects the signals 22a, 24a emitted by the transmitter 20 as energy bouncing or reflecting off the diffuse ceiling surface 18. In an alternative embodiment, visible points may be used in place of infrared points. An on-board camera may replace the infrared receiver in detecting either infrared or visible points. The robot's microprocessor converts the signals 22b, 24b sensed by the receiver 28 into bearings from the robot 12 to the signals 22b, 24b. The microprocessor calculates the representative elevation angles $\epsilon_1$, $\epsilon_2$ and the azimuths $\alpha_1$, $\alpha_2$ of the signals to determine the location of the robot 12 within the working area 14. In this embodiment, the azimuths $\alpha_1$, $\alpha_2$ are measured utilizing the "forward" direction of movement M of the robot 12 as a datum, but any suitable datum can be used. By calculating the elevation angle and azimuth from the robot 12 to the two signals 22b, 24b, the robot 12 is able to locate itself within a room with accuracy.

Figure 2:
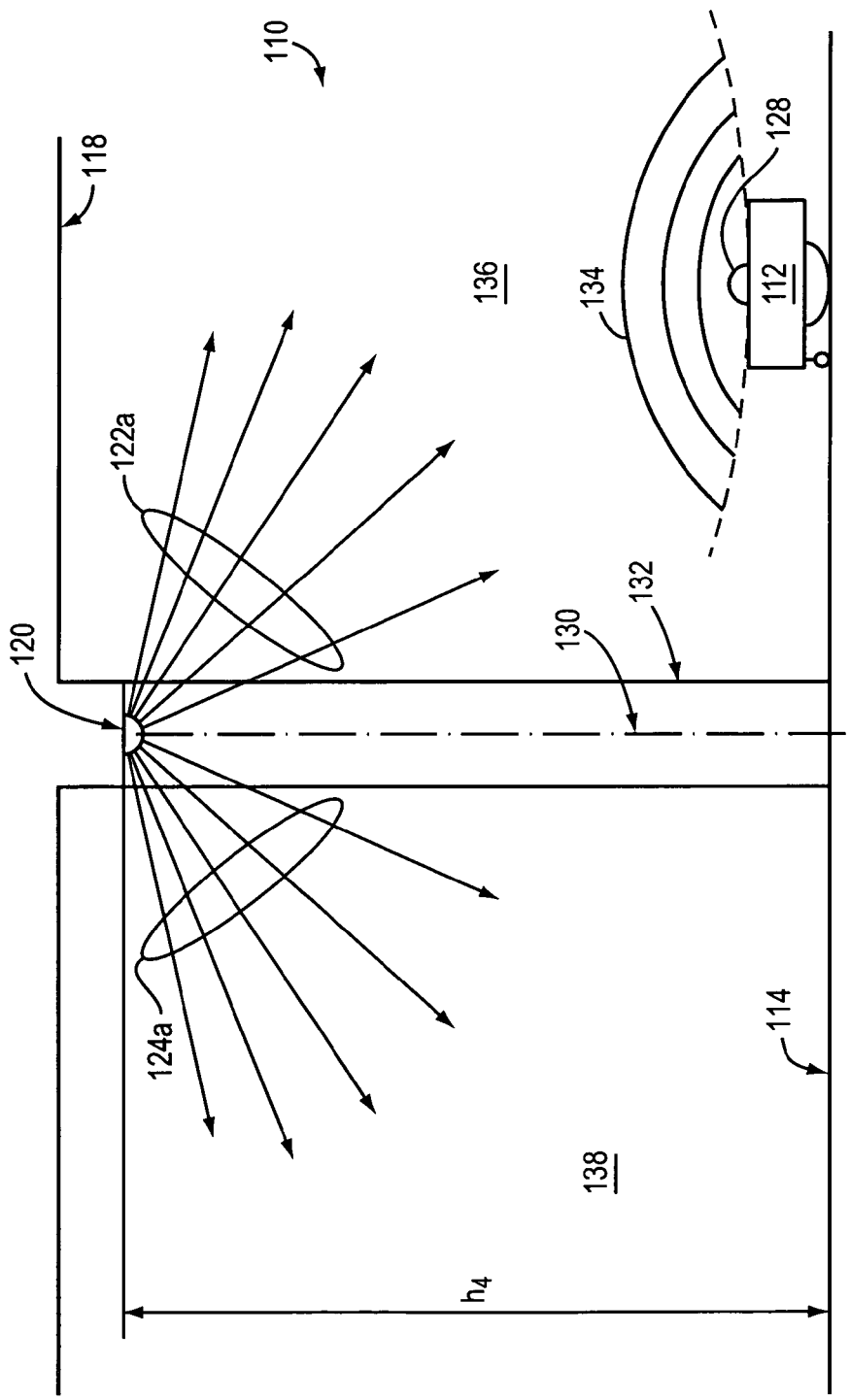
FIG. 2 is a schematic view of a navigational system for an autonomous robot in accordance with another embodiment of the invention.

FIG. 2 depicts another embodiment of a navigational system 110 for an autonomous robot 112 in accordance with the invention. Here, a robot 112 moves in a working area, in this case a floor 114. A transmitter 120 is installed at the top frame of a doorway 132 between two rooms 136, 138. Similar to the embodiment depicted in FIG. 1, the transmitter 120 is installed at a known distance $h_4$ above work area 114. In other embodiments, the transmitter 120 may be installed at the height of ceiling 118. The transmitter 120 may also be recessed within the door frame 130 or ceiling 118 to reduce its profile and limit the impact on architectural aesthetics of a room. Additionally, the transmitter 120 may be disguised to resemble a cover plate for a sprinkler head, speaker, or other device.

The transmitter 120 emits two signals 122a, 124a (depicted graphically by a plurality of arrows) into the two rooms 136, 138. The signals 122a, 124a may be configured to not overlap each other, therefore providing a distinct signal on each side of the door centerline 130. In other embodiments, overlap of the signals 122a, 124a may be desired. The robot 112 includes a receiver 128 that has a field of vision 134. The emitted signals 122a, 124a are detected by the receiver 128 when the robot's field of vision 134 intersects the signals 122a, 124a. Similar to the embodiment in FIG. 1, the robot calculates the azimuth and elevation to the transmitter 120 to determine its relative location. Similar to the embodiment described above, by detecting only one signal, the robot 112 can calculate a bearing to the transmitter 120. Accordingly, the transmitter 120 functions as a beacon for the robot 112 to follow and, if the signal is coded, the robot 112 may determine which room of a number of rooms it is located in, based on the coded signal. In this regard, the robot 112 is able to determine its relative location, on a room-by-room basis, as opposed to determining its location within a room.

Figure 3A:
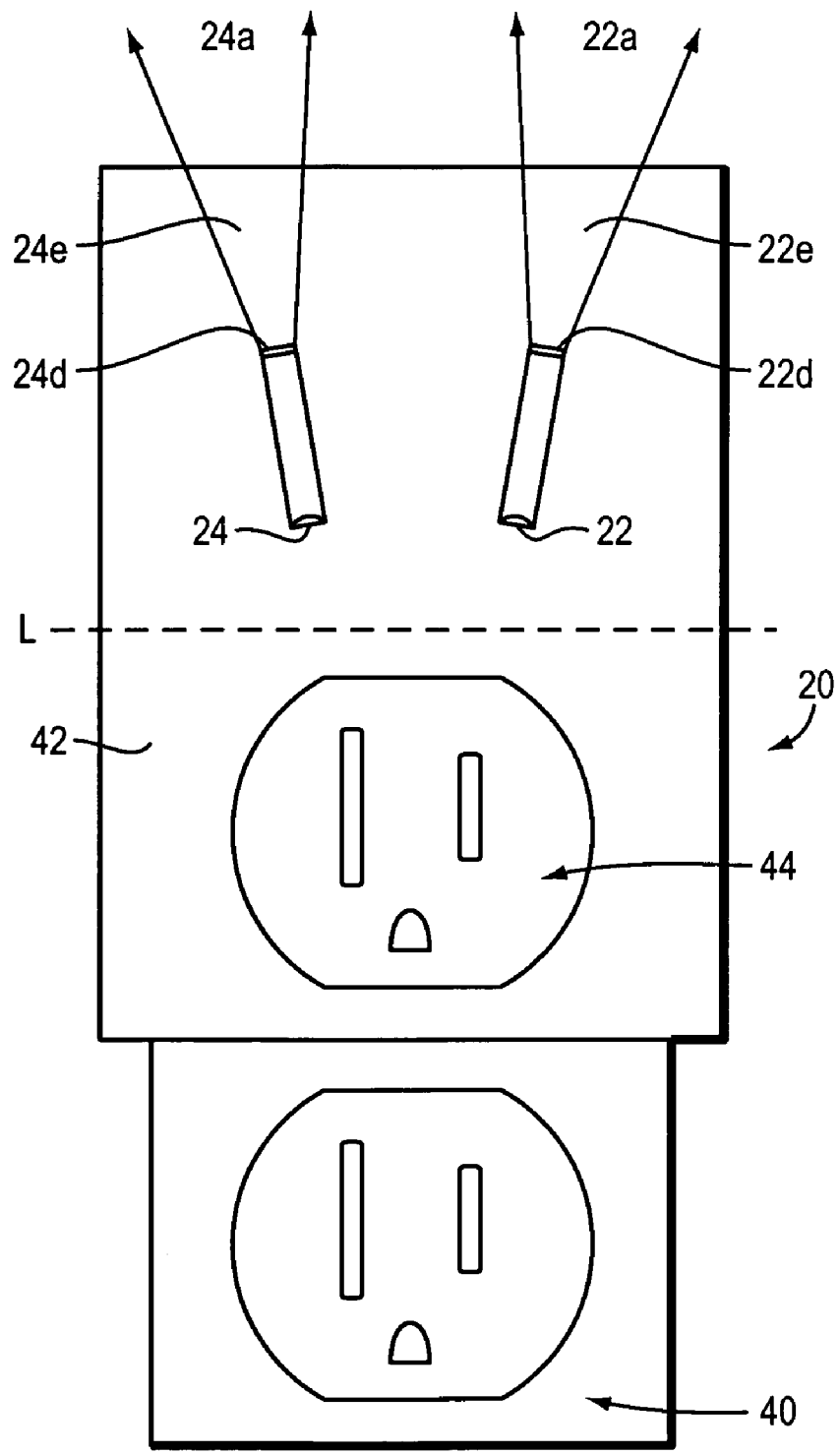
FIG. 3A is a side view of a stationary emitter in accordance with one embodiment of the invention.

FIG. 3A shows a transmitter 20 in accordance with one embodiment of the invention. The depicted transmitter 20 is plugged into a wall outlet 40 for convenience and unobtrusiveness, but other transmitters and locations may be utilized. For example, the transmitter may be placed anywhere within a room, provided it has an available power source. Battery-powered transmitters are particularly versatile, in that they may be located remote from a wall outlet. Such battery-operated transmitters could be unobtrusively located above window or door frames, or on top of tall furniture such as dressers or bookshelves. Optionally, the transmitter may include a visible signal option, aligned with the emitted signals, allowing a user to direct the signals to particular locations when the device is initially installed. Additionally, more than one transmitter may be used, if desired. Such a system could include communication capability between the various transmitters, for example to ensure that only one signal or a subset of signals are emitted at any given time.

The transmitter 20 in FIG. 3A includes a housing 42, constructed of plastic or like material. The transmitter 20 may include a power receptacle 44 so the outlet that the transmitter 20 utilizes for power is still available for other uses. (In this figure, the transmitter 20 is shown cut-away above the line L.) The transmitter includes two emitters 22, 24, set within the housing 42. Alternatively, the emitters 22, 24 may be flush with or extend beyond the housing 42. Setting the emitters 22, 24 within the housing 42 allows the signals 22a, 24a to be directed by utilizing collimators 22e, 24e. The collimators 22e, 24e may be formed within the housing 42 or may be discreet components within the housing 42. Alternatively, the collimators 22e, 24e may be secured to the outside of the housing 42. In alternative embodiments, lenses 22d, 24d may be included, with or without collimators 22e, 24e to focus and direct the signals 22a, 24a. These basic manufacturing considerations can also be adapted for emitters that are utilized on charging or base stations as well. One or more emitters on a base station can serve as an additional point of navigation for the robot within the room, or may simply aid the robot in locating the base station.

Figure 3B:
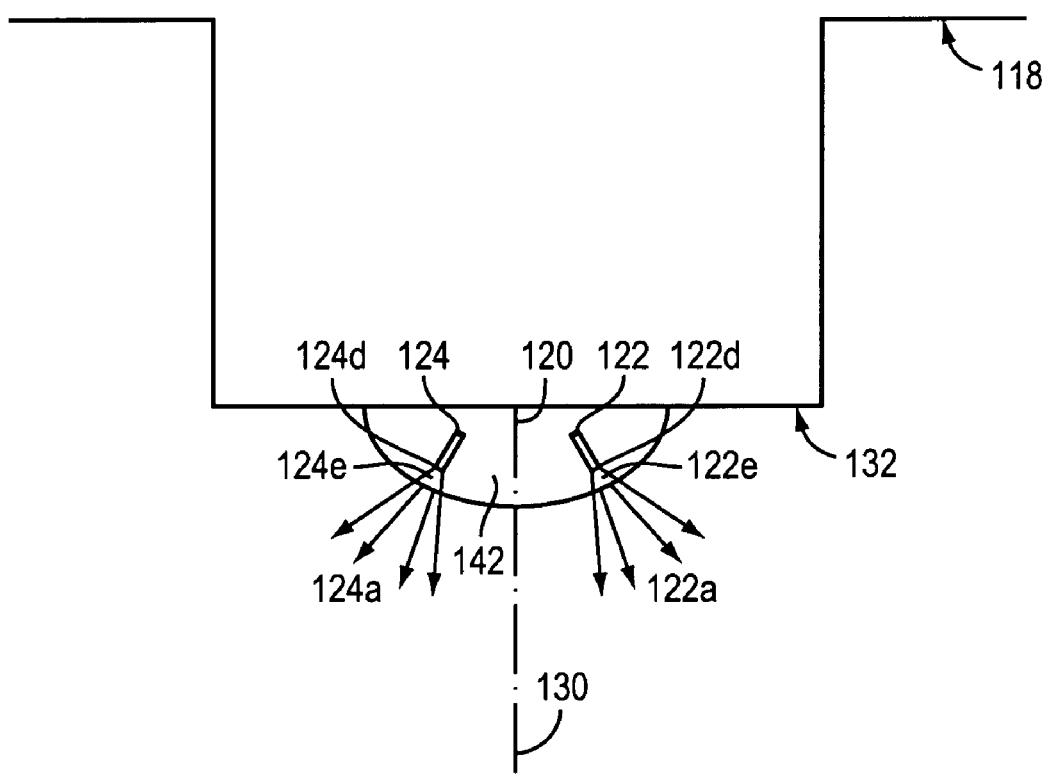
FIG. 3B is a side view of a stationary emitter in accordance with another embodiment of the invention.

FIG. 3B depicts a transmitter 120 for use with the navigational system 110 depicted in FIG. 2. The transmitter 120 is secured to the underside of an upper cross member of the door frame 132, but may also be recessed therein or secured to or recessed within ceiling 118. The transmitter 120 includes two emitters 122, 124. Other embodiments of the transmitter 120 may include more than two emitters or just a single emitter, depending on the application. By utilizing two emitters the transmitter can direct signals into two different rooms, generally on either side of the centerline 130 of the door frame 132. This allows a robot to distinguish in which room it is presently located. More than two emitters may be utilized with collimators 122e, 124e to distinguish different areas within a given room. Such configuration allows the robot to sense its relative location within a room and adjust its cleaning behavior accordingly. For example, a signal could mark an area of the room that the robot would likely get stuck in; the emitted signal could allow the robot to recognize the area and accordingly not enter it, even though it might otherwise be able to do so unimpeded. Alternatively, or in addition, the different signals could mark areas that require different cleaning behaviors (due to carpeting or wood floors, high traffic areas, etc.).

Turning back to FIG. 3B, the emitters may be installed flush with or extend beyond the housing 142. Setting the emitters 122, 124 within the housing 142 allows the signals 122a, 124a to be directed by utilizing collimators 122e, 124e. The collimators 122e, 124e allow the signals 122, 124 to be directed to two sides of the centerline 130 of doorframe 132, without any signal overlap, if so desired. The collimators 122e, 124e may be formed within the housing 142 or may be discreet components within the housing 142. Alternatively, the collimators 122e, 124e may be secured to the outside of the housing 142. In alternative embodiments, lenses 122d, 124d may be included, with or without collimators 122e, 124e, to focus and direct the signals 122a, 124a.

In one embodiment of the invention, each signal (regardless of emitter location or number of signals) is modulated at 10 kHz, and is coded with an 8-bit code to serve as a unique identifier of the signal, thus preventing the robot from confusing one point with another. Accordingly, more than two signals may be employed to increase the accuracy of the robot's calculations regarding its location within a working area. As noted above, using only one emitter allows the robot to take a heading base on that signal. Using more than two points enables the robot to continue navigating, if fewer than all of the points are detected (either due to failure of a signal transmission or if the robot moves to a location where fewer than all the points are visible).

In one embodiment, the transmitter pulses the coded signals as follows. After an initial synchronization pulse, the first signal at 10 kHz is emitted for 100 ms. This provides a sufficient time period for the receiver and the processor in the robot to calculate azimuth and elevation angles, as discussed in detail hereinbelow. So that the robot can also determine which signal is being received, the transmitter next pulses a series of five bits, each for 10 ms. The five bits include two start bits, for example a zero and a one, followed by a unique three bit identifier to identify that particular signal or point. After a 100 ms delay, the transmitter repeats the sequence for the second signal or point. By changing the modulation frequency and/or the identifier, the second signal or point can be uniquely distinguished from the first. Any number of unique signals can be transmitted and identified, in this manner. After the series of signals are transmitted, the transmitter waits a substantially longer period of time, for example on the order of a random one to two second interval, before repeating the transmitting sequence, starting again with the first signal. The length of time for each transmission is merely exemplary, and may be varied based upon user preference, application, or other needs. Additionally, the signals may be modulated at the same or different frequencies.

Figure 4A:
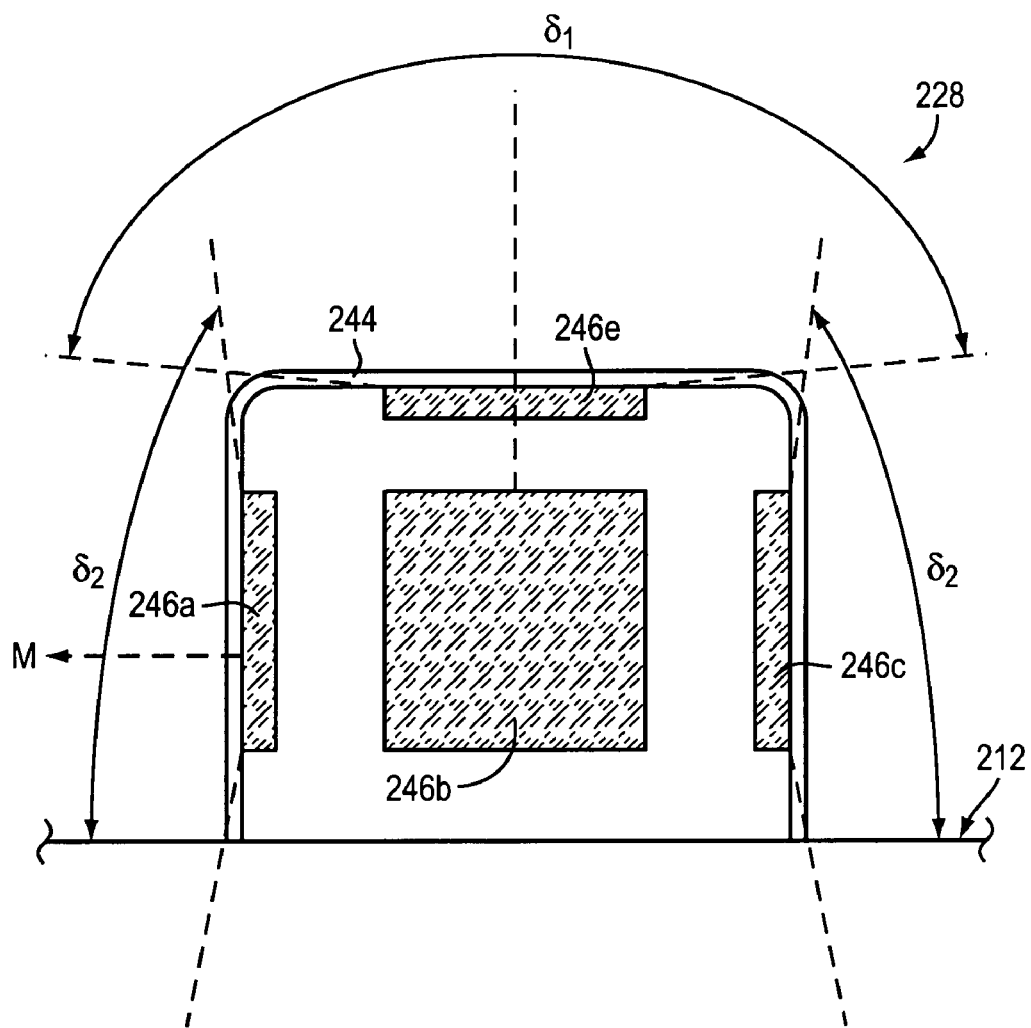
FIG. 4A is a side view of a infrared receiver for an autonomous robot in accordance with one embodiment of the invention.
Figure 4B:
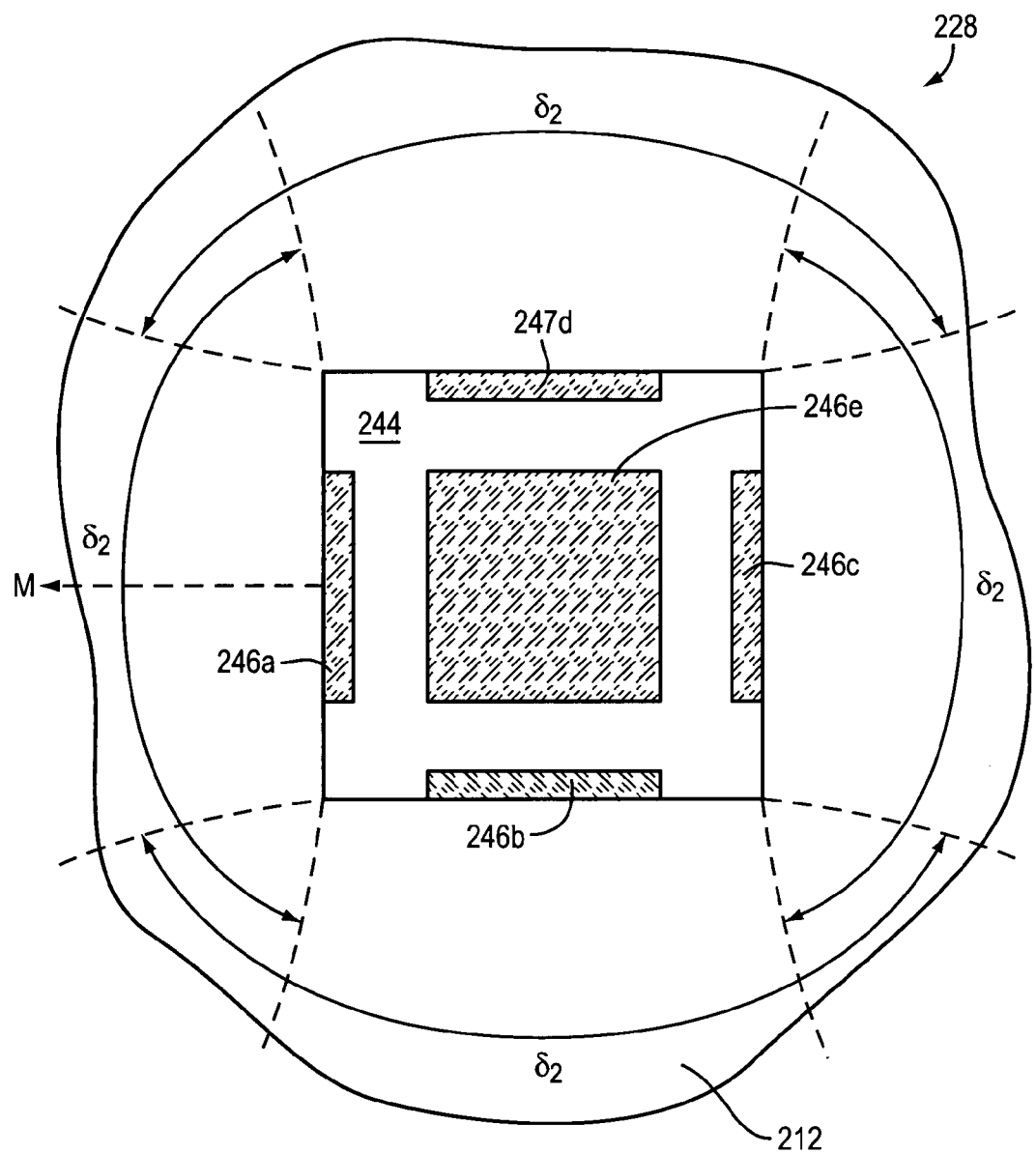
FIG. 4B is a top view of the infrared receiver of FIG. 4A.

FIG. 4A depicts a side view of a receiver 228 for use with an autonomous robot, the receiver 228 surface mounted on the robot housing 212. FIG. 4B is a top view of the same receiver 228. The receiver 228 includes an outer shell or housing 244 of a generally translucent or transparent, high-impact plastic or like material. Four photodiodes 246a, 246b, 246c, and 246d are installed in an orientation in the housing 244 generally corresponding to four adjacent sides of a cube. Accordingly, each photodiode is generally perpendicular to the two photodiodes on either side of it and parallel to the photodiode opposite it. Located generally above the plane of orientation of photodiodes 246a-246d is a fifth photodiode 246e. At least one photodiode, in this case photodiode 246a, is oriented toward a direction of forward movement M of the robot. The photodiodes are connected via control wiring and other components to the robot's microprocessor and related systems. Installing the receiver 228 on the top of the housing 212 provides the robot with a very wide field of view. As depicted, the field of view $\delta_1$ for the horizontally oriented photodiode 246e is extremely wide. Depending on the sensitivity of the photodiode 246e, the thickness or translucence of the plastic, and other factors, the field of view $\delta_1$ may approach or exceed 180°. Similarly, due to the orientation of photodiodes 246a-246d, their field of view $\delta_2$ approaches near vertical in the direction upwards from the robot housing 212 and is limited below only by the robot housing 212 itself. There is overlap between the fields of view $\delta_2$ in the longitudinal plane, as depicted in FIG. 4B.

As apparent from FIG. 4A, there is overlap between the fields of view $\delta_1$ and $\delta_2$, allowing the robot to readily detect signals within a space in which the robot is operating. The overlap creates a total field of view for the receiver that approaches the entire volume of the room above the robot housing. Accordingly, this embodiment of the receiver 212, is particularly well-suited to the embodiment of the navigation system depicted and described in FIG. 2, where a signal is projected into an entire room. Of course, this receiver 228 could also be used with the system depicted in FIG. 1. Although installing the receiver closer to or above the top surface of the robot provides for a wider range of view, this configuration increases slightly the height of the robot and can limit robot travel beneath certain obstacles such as couches, low tables, or the like.

Figure 4C:
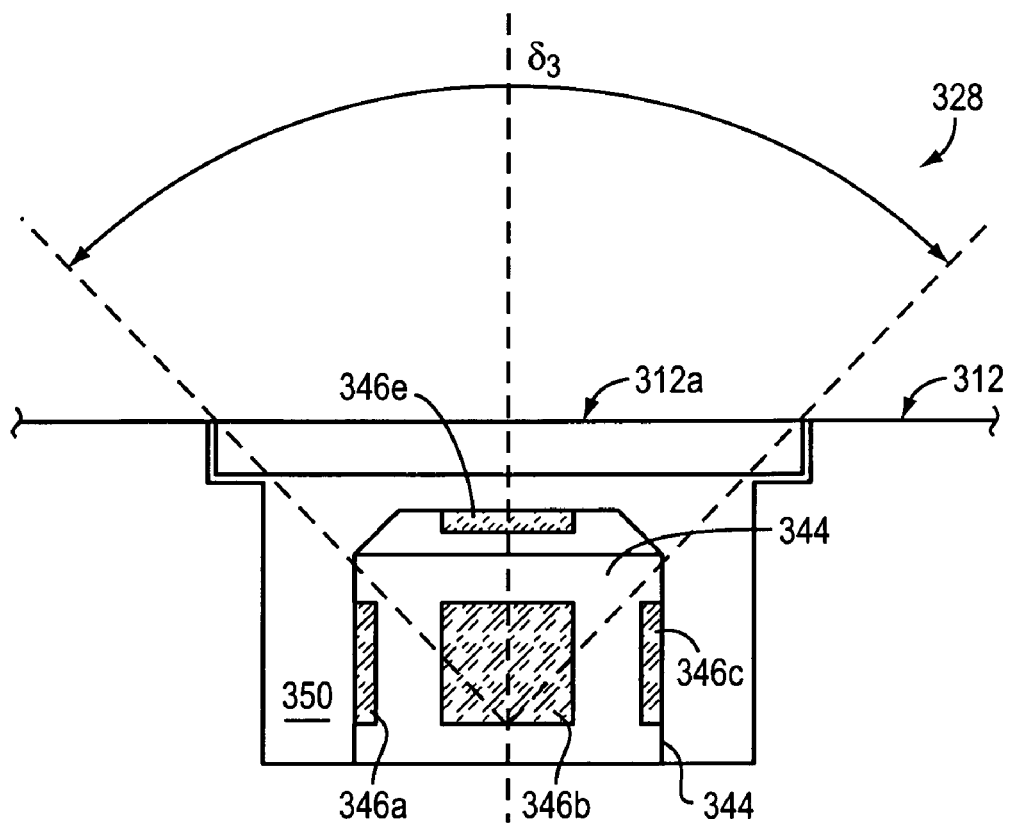
FIG. 4C is a side view of a infrared receiver for an autonomous robot in accordance with another embodiment of the invention.

FIG. 4C depicts an embodiment of the receiver 328 installed below the surface of the robot housing 312. The photodiodes (as a group, 346) are installed in a void 350 or other cavity below the surface of the robot housing 312. A translucent or transparent plastic cover 312a fits over the void and photodiodes 346. The cover 312a may be secured to the housing 312 with screws, press-fit connections, or other connectors. Alternatively, the cover 312a may be simply set in place without connectors, allowing for easier access to the photodiodes 346 for service or replacement. This lower profile version reduces or eliminates the risk associated with the surface mounted receiver described above getting stuck below obstacles.

The construction of this receiver 328 is similar to that of FIG. 4A. Four of the photodiodes 346a-346d are installed orthogonal to each other, facing a predefined direction on the robot (i.e., front, back, right, and left). The fifth photodiode 346e is installed orthogonal to the other four, facing directly up from the top of the robot. Because the photodiodes 346 are set within the housing 312, the receiver's overall field of view $\delta_3$ is limited somewhat. In this embodiment, $\delta_3$ equals approximately 120°. The field of view $\delta_3$ may be wider or narrower depending on the depth of installation below the surface of the robot housing 312. Alternatively, the field of view $\delta_3$ may also be modified by utilizing a cover 312a having particular effects on signal transmission, such as a fish-eye lens or the like.

Figure 5A:
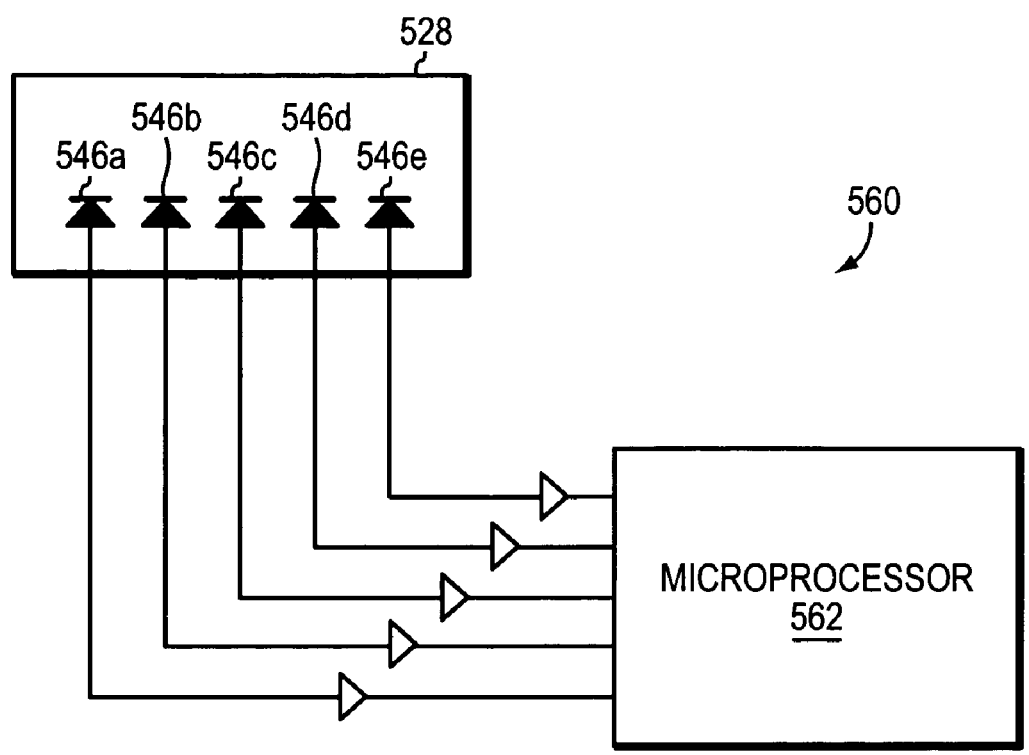
FIG. 5A is a representation of the control system of an infrared receiver for an autonomous robot in accordance with one embodiment of the invention.

One embodiment of the control schematic 560 for the receiver 528 is depicted in FIG. 5A. The infrared receiver 528 includes a number of independent photodiodes (generally, 546), pre-amplified and multiplexed into a single microprocessor 562. As described above, four of the photodiodes 546a-546d are installed orthogonal to each other, facing a predefined direction on the robot (i.e., front, back, right, and left). The fifth photodiode 546e is installed orthogonal to the other four, facing directly up from the top of the robot. Once a reflected signal is received by a photodiode 546, the receiver 528 determines the frequency of modulation of the signal, the identity sequence, if any, and the envelope of received energy (i.e., the demodulation of energy). These values are sent to the microprocessor 562 that, in turn, calculates the location of the robot relative to the signals and the identities of the signals. Additionally, if only a single point is detected by the receiver 528 (if, for example, the robot's view of the second signal is obstructed), the robot may use this point as a heading. By following this heading, the robot can move within the work area until the second point is detected.

In operation, the receiver first measures the "noise floor," the amount of infrared energy present in the space in which the robot is located, which it sets as the threshold value. Generally, this value is the average of the values for each photodiode. Any subsequent measurement above this threshold value triggers an event (e.g., a calculation of point azimuth and elevation). The receiver then measures the modulation frequency again, searching for an expected increase at 10 kHz (i.e., the frequency of the initial synchronization signal transmitted by the transmitter). If a 10 kHz frequency increase is detected, the robot recognizes this as an emitted navigational signal. The robot then measures the amplitude of the reflected point on all five photodiodes to determine an average value. This value is then compared to a list of signal frequencies to determine which of the signals has been detected. Alternatively, any detected identity sequence associated with the signal can be compared to a list of transmitter codes or signal IDs stored in a lookup table in the robot processor memory.

The on-board microprocessor uses the amplitude value to determine the azimuth and elevation of the received signals, that it then uses to determine its location within a working area. To determine the azimuth, the microprocessor enters the values of the two strongest readings from the four side photodiodes into an algorithm. The algorithm takes the ratio of these two readings to determine the azimuth angle. For example, if the two strongest readings from two photodiodes are equal, the algorithm recognizes that the point is located at an azimuth angle that is directly between the two photodiodes (i.e., at 45 degrees). In a similar algorithm, the amplitude value measured from the strongest side photodiode and the amplitude value measured from the top-facing photodiode value are used to determine the elevation of the signal. These values are then stored in the robot's memory for future reference.

Once the receiver has detected at least two points, and determines the azimuth and elevation of each point, it determines its location within the working space. A triangulation algorithm based on the known ceiling height and the azimuth and elevation of the two detected points allows the processor to determine where in the working space the robot is located. Over time, the values of elevation and azimuth between each coded point and specific locations of the robot within the workspace are stored in the robot's memory, creating a map of the environment in which the robot operates.

Figure 5B:
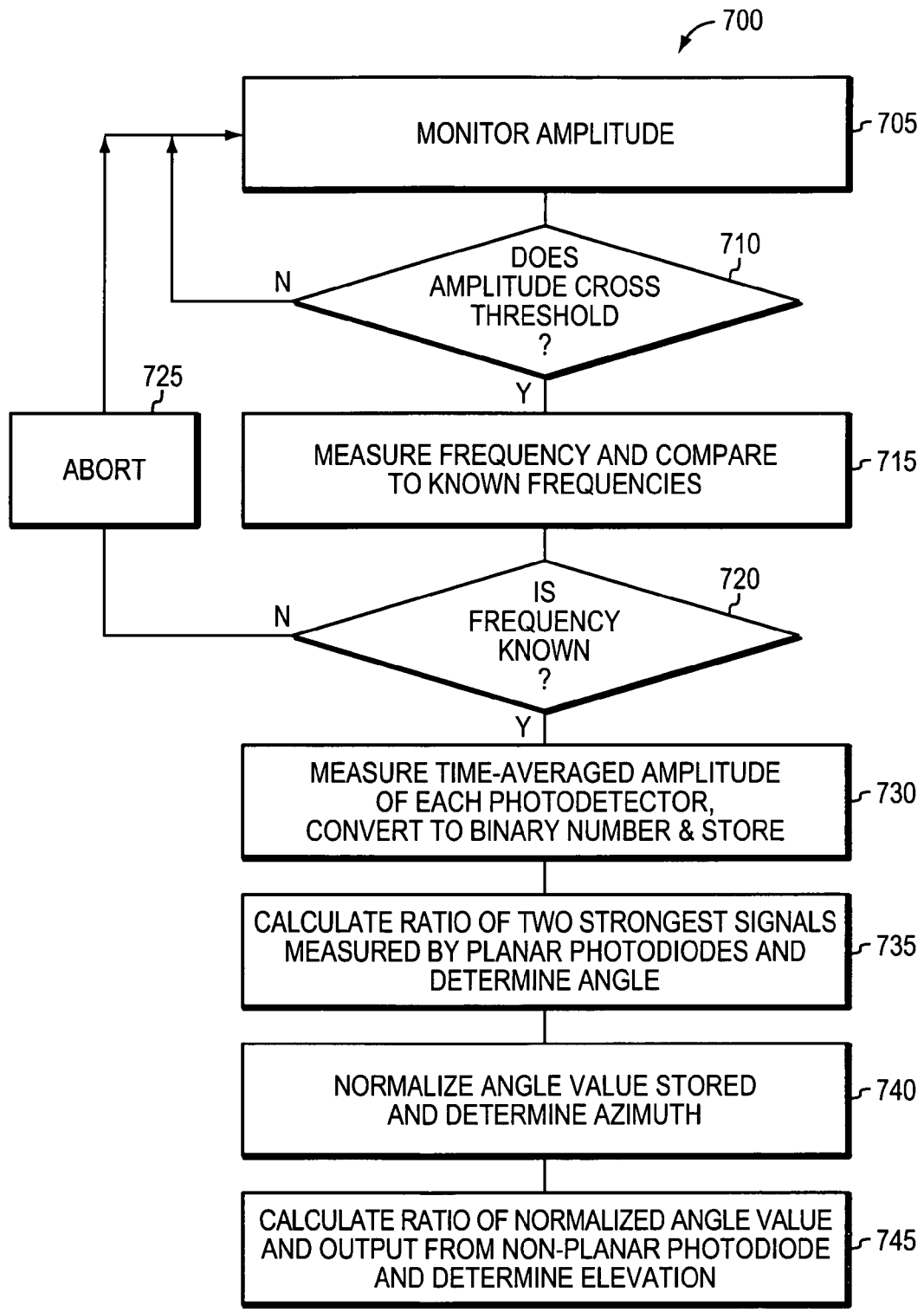
FIG. 5B is a flowchart of a signal detection and localization program in accordance with one embodiment of the invention.

In a specific embodiment, the navigation system 200 depicted in FIG. 5B uses an angle-based localization system. Values corresponding to elevation and azimuth are determined by synchronously comparing average amplitudes from the number of detectors arranged on the robot. Of the five detectors, four are arranged in a plane and are angularly spaced by 90° increments. The fifth detector is in the center of the aforementioned four-detector array and aimed so that it is orthogonal to every detector, directed vertically from the robot. Together, this five-element array has a full or near-full hemispherical field of view.

In the embodiment depicted in FIG. 5B, all five detectors monitor for amplitude (Step 705) until an amplitude that crosses a preset threshold is detected (Step 710). After the amplitude on any detector crosses the preset detection threshold, the frequency of the signal on the strongest detector is measured and compared against known transmit frequencies (Step 715). If the measured frequency is one of the known transmit frequencies (Step 720), the next step in the detection process is executed. If the signal is not a known transmit frequency, the detection process is aborted (Step 725) and the signal detected is declared to be "out of band." Once an "in band" frequency is detected, a time-averaged amplitude of each photodetector is measured, converted to a binary number, and stored for later processing in a microprocessor memory (Step 730). Upon storing the five numerical values (one for each photodiode), the azimuth angle is determined.

Of the four detectors that reside in a single plane, the values of the two strongest signals detected are used to form a ratio to determine the azimuth angle (Step 735). The ratio of second-strongest signal over the strongest signal is either compared to a look-up table or inserted into a mathematical equation to determine an azimuth angle output. Both the look-up table and the equation represent the overlap of the received sensitivity patterns of two orthogonal detectors with known sensor responses. In this embodiment, the photodetector output is modeled as a fourth-order Gaussian response to angle off of "boresight," a term that generally refers to a vector that is orthogonal to the semiconductor die in the detector package.

To calculate elevation, the strongest signal from azimuth calculation (i.e., the denominator of the ratio) must first be normalized, as if it were on boresight of the respective detector (Step 740). For example, if the azimuth has been determined to be 10° off of boresight from a given detector, that 10° angle is entered into a look-up table or equation that describes the sensor response of any single photodetector. At zero degrees, the output of this look-up table/equation would be 1.00000. As the angle deviates from zero degrees, the output drops to some fraction of 1.00000 (the normalized value at boresight). For example, if a value of 10° is entered into said equation, the output of this operation may be 0.99000. The denominator of the azimuth ratio is then divided by this fractional value in order to scale up, or "normalize," that value to what it would be if the azimuth were actually zero degrees. This normalized value is then stored in memory, and elevation may be determined.

To calculate elevation, the normalized output from the previous step is used to produce a new ratio with the output from the upward-looking (fifth) detector, such that the numerator is the second-strongest of the two values and the denominator is the strongest of the two values (Step 745). This ratio is then entered into the same look-up table or equation from the step above (used to calculate azimuth), thus outputting an elevation angle.

Benefits of this type of navigation system are numerous. As the robot moves about a working area, measuring the azimuth and elevation of the various points detected, the robot can create a map of the area, thus determining its location within a given space. With this information, the robot can fuse data from all of its on-board sensors and improve cleaning or other task efficiency. One way it can do this is to create a map where the high-traffic areas in a house or other building are located (as indicated by readings from the dirt sensor, for example). The robot would then clean the areas it identified as high traffic (and therefore, often dirty) each time it passes over that area, whether directed to or not. The robot may also improve its cleaning function by merging the output from the wheel drop, stasis, bumper, and wall-following sensors to roughly mark areas of entrapment, or where large obstacles exist, so that those areas can potentially be avoided in future runs.

Another method of improving cleaning efficiency involves selectively programming the robot to clean particular areas, as detailed below. For example, a personal computer or remote control may be used to control the autonomous robot. Although the robot can operate without operator intervention, an operator would first set up the robot, or may wish to direct the robot to operate in particular areas or at particular times. For example, by using a number of transmitters in various rooms on one floor of a house, an operator may be able to direct the robot to clean a number of specific rooms at a certain time. The operator could select, in the control program field of the computer program, the living room, family room, bathroom, and kitchen areas for selected cleaning. Once commanded (either immediately or on a predefined schedule), the robot would be signaled to begin its cleaning cycle. The robot undocks from its base/charging station and begins cleaning the closest room on the programmed list. It recognizes this room and can differentiate it by the coded group of infrared points on the ceiling or the coded signal emitted in the room. After the first room is cleaned, the robot checks its level of power, and if needed, returns to its charger for additional charging. In order to return to the charger, in one embodiment the robot can follow the point or points on the ceiling back to the base station. After charging is complete, the robot traverses the area roughly back to the place it left off and resumes cleaning. This sequence of events continues until all of the programmed rooms have been cleaned. Alternatively, the selection of particular areas to clean could be made by remote control or by pressing buttons on a control panel located on the base station. By using a personal computer, however, multiple transmitters could communicate with each other and with the base station via power lines using HOME GENIE®, ECHELON®, or equivalent technology.

Figure 6:
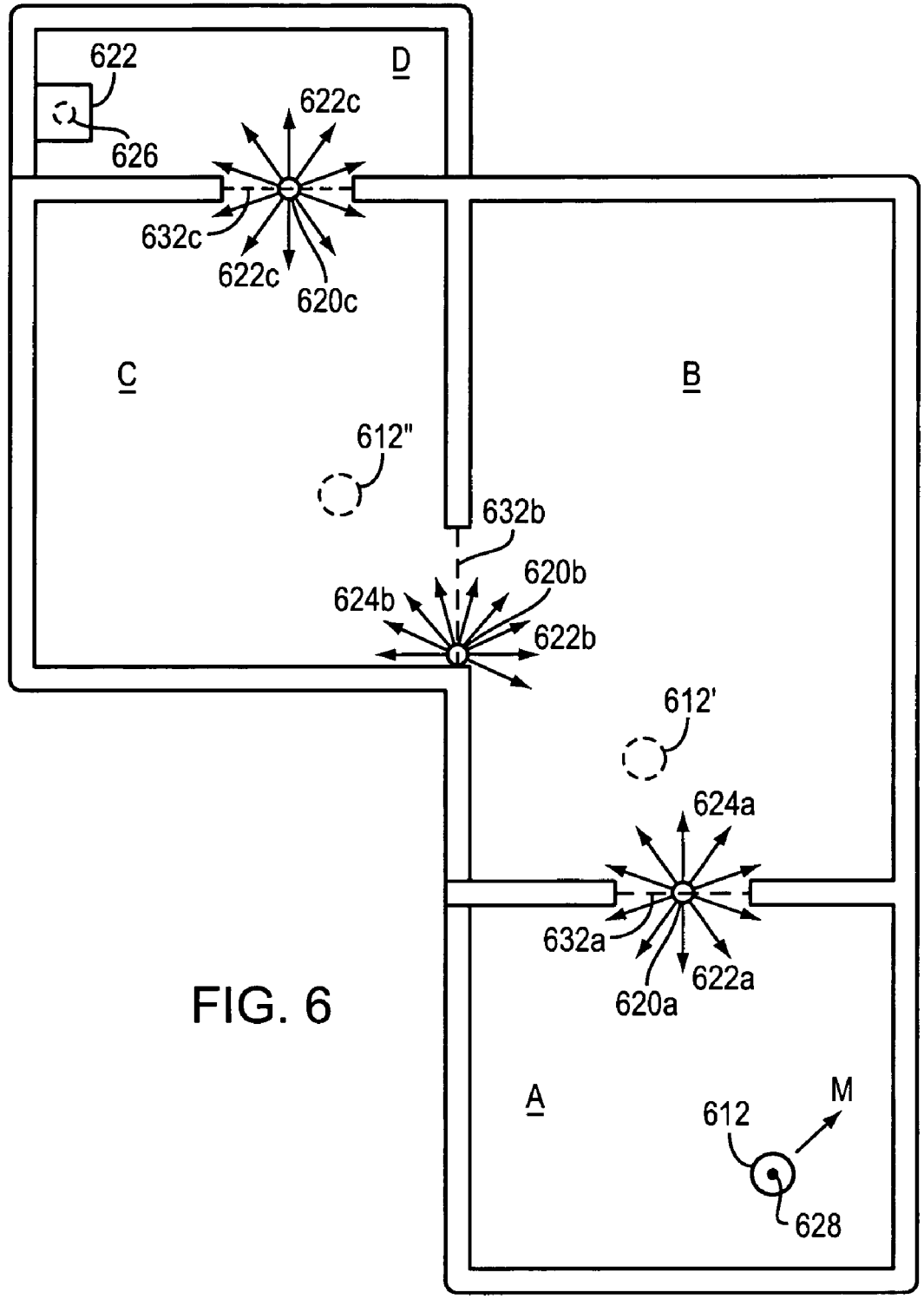
FIG. 6 is a top view of a navigational system for an autonomous robot in accordance with another embodiment of the invention.

An alternative embodiment is depicted in FIG. 6, where a robot uses a number of signals for headings to move from room to room. Robot 612 is moving M within room A when its power level drops below a predetermined level, requiring the robot to return to is base charging station 622. Upon crossing the predetermined power level, the robot's receiver 628 searches for a signal from a nearby emitter. As the robot is located in room A, it detects the signal 622a emitted from transmitter 620a and, using the signal 622a as a heading, moves directly for that signal 622a.

Alternatively, the robot 612 may emit its own coded pulse, to determine if any transmitters are in the area. This coded pulse could "awaken" sleeping or otherwise dormant transmitters, which would then begin their own emission cycle. Alternatively, the pulse may be some audible or visual signal such as a distinct beep, buzz, or visual strobe. Note that this pulse need not be within the field of view of the transmitter.

The robot 612 will continue to move toward signal 622a until one of several events happens at or near doorway 632a. In the first event, the robot may determine, based on readings from its photodiodes, that it is directly under the transmitter 620a. In the second event, the robot 612 may sense a second signal 624a, that may overlap the first detected signal 622a. This event would occur if the configuration of the emitters, collimators, etc., as described in more detail above, provided overlapping signal patterns between signals 622a and 624a. In a third event, robot 612 may sense a signal from an entirely different transmitter, in this case signal 622b from transmitter 620b. Other events are also contemplated, as suitable for the particular application. The occurrence of the event presents the robot 612 with any number of behavioral, functional, or other options. For example, each coded signal may serve as a unique marker for a different working space. Upon detecting the unique signal associated with a particular working space, the robot may alter its cleaning function. If room A is carpeted but room B is uncarpeted, the robot may adjust its cleaning as it moves from room A to room B. Alternatively, if room B is a known high traffic area and the robot has sufficient power available, the robot 612 may spend a period of time cleaning room B before continuing its return to base 622. Upon detecting a second signal (in this case, signal 622b) the robot may completely disregard the first signal 622a received when the return to the base station 622 began. Using new signal 622b as a heading, it begins moving toward that signal 622b. The robot 612 may also check its battery level at each event, storing that value in its microprocessor. Over time, the robot will have created a table of battery levels at each event (and battery level change from event to event), and be able to accurately determine precise battery power remaining at each transmitter location.

Once the robot has been moving in room B (shown as 612' in phantom), it will eventually determine, based on battery level, time, or other factors, to follow the heading provided by signal 622b, and continue its return to its base station 622. The robot 612 will follow the heading until an event occurs at or near doorway 632b. Again, the event may be detecting a strength of signal 622b, indicating that the robot is directly below the transmitter, detecting an overlap signal from 624b, or detecting a new signal 622c. The robot 612 may again perform any of the behaviors described above, check and store its battery level, change cleaning characteristics, etc.

Once in room C, the robot 612" may again, as required, begin to follow the heading provided by signal 622c. Again, at or near doorway 632c to room D, an event may direct the robot to perform any number of behaviors. Alternatively, the robot may move directly to charging station 622, guided by emitted signal 626 or some other signal or program.

During its return to base station, as the robot 612 moves from room A to room B to room C and so on, it detects and stores the information about each coded signal that it detects along its route. By storing this information, the robot creates a map, using the coded signals as guideposts, allowing it to return to its starting location in the future. After charging, the robot can return to the room it was working in prior to returning to its base, by comparing the detected signals to those stored in its memory.

Figure 7:
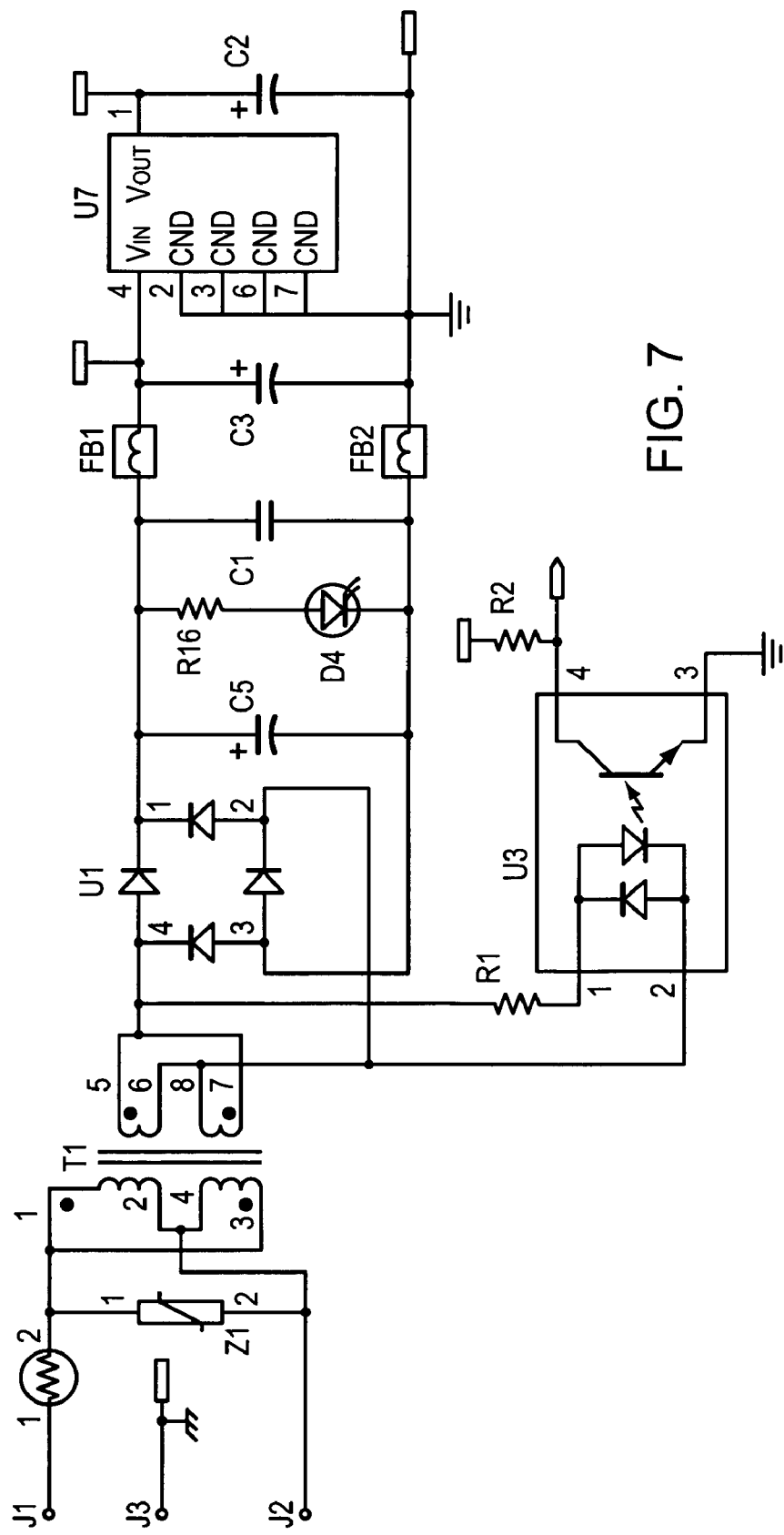
FIGS. 7-14 are schematic circuit diagrams of infrared receivers and transmitters for a navigational system in accordance with one embodiment of the invention.
Figure 8:
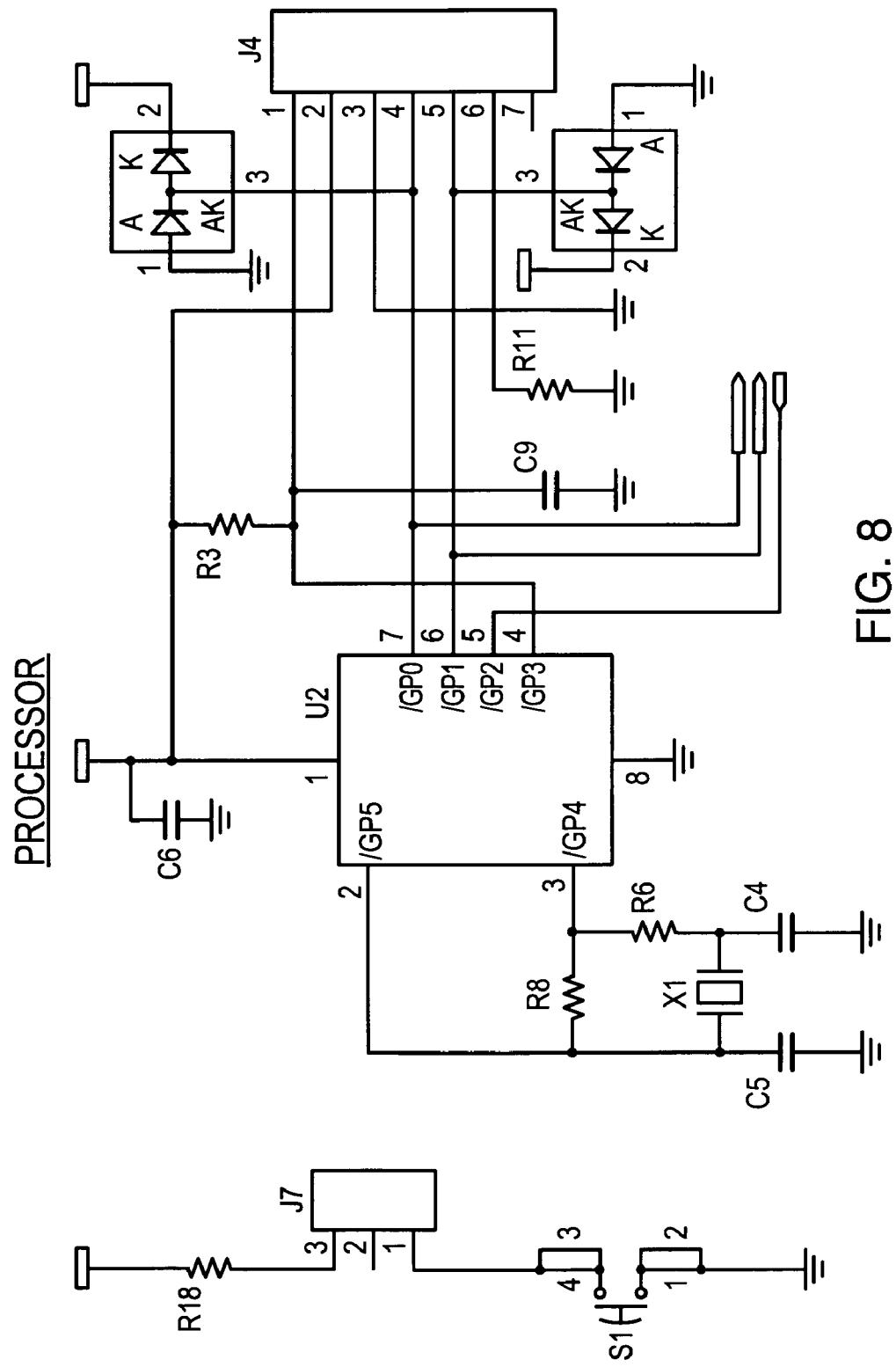
Figure 9:
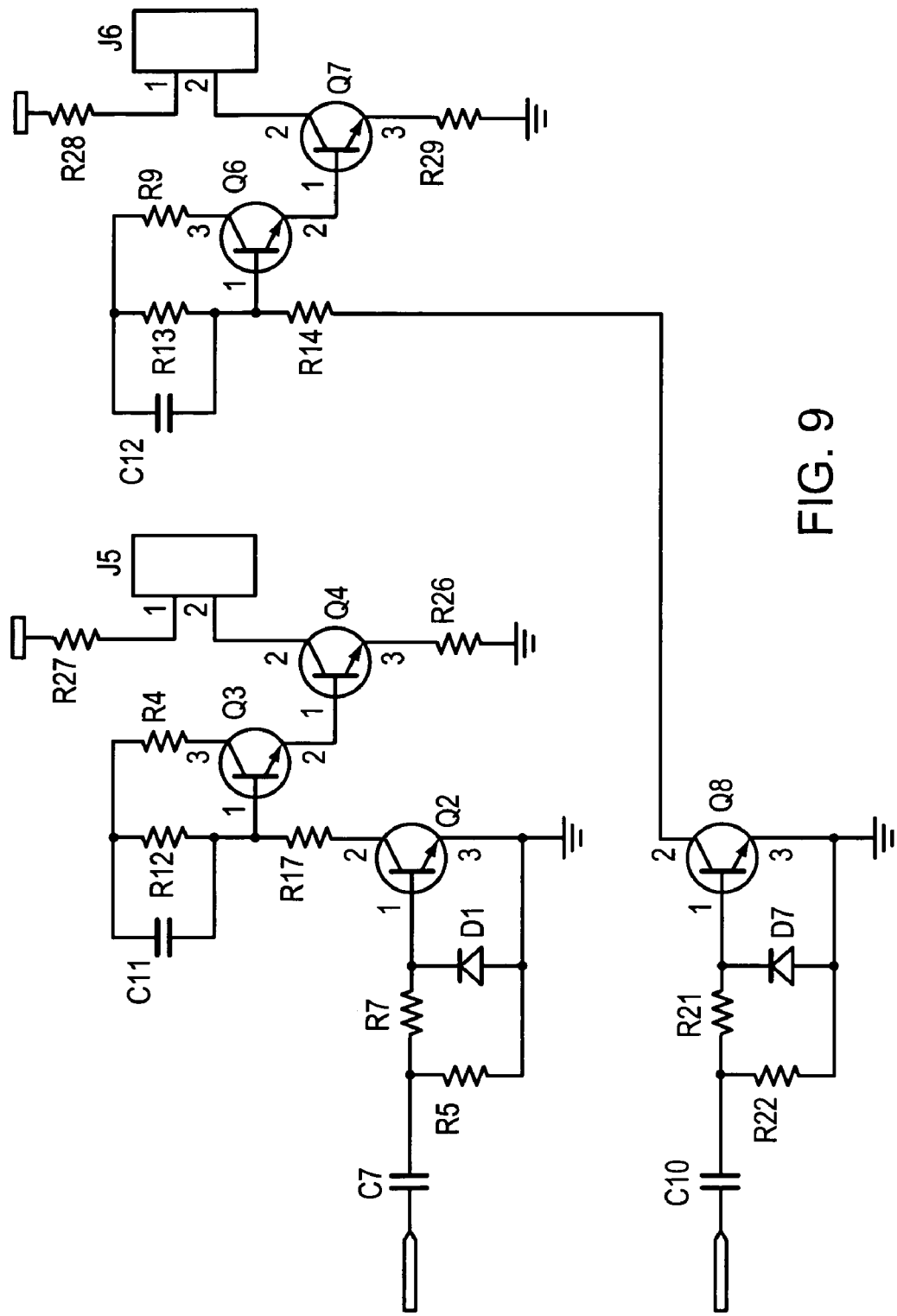

FIGS. 7-9 depict schematic circuit representations in one embodiment of various components of an infrared signal transmitter, namely an AC-DC converter, a microcontroller and support circuitry, and LED drivers. More specifically, FIG. 7 shows an electronic circuit that takes 120V AC/60 Hz line voltage and converts it to a regulated +5VDC supply. This supply is used to power the microcontroller and associated circuitry of the transmitter, depicted in FIG. 8. In addition to the power conversion, this circuit also provides an isolated digital logic signal to the microcontroller, whenever a "zero-crossing" in the AC line input is detected.

FIG. 8 includes the transmitter microcontroller and support circuitry (i.e., a clock oscillator and an in-circuit serial programming port). In addition, there is a circuit that allows a user initiated button press to project visible light from a pair of LEDs, co-located with the pair of IR LEDs, onto the remote surface for the purpose of assisting the user in aiming the infrared signal points.

FIG. 9 depicts two channels of infrared LED driver. Each driver controls a preset constant current into a single IR LED, that then emits near-infrared light that is collimated by an external lens and projected onto the remote surface. Each LED is modulated and can be pulse-coded independently of the other. This allows the microcontroller in the robot to discern between the different transmitter signals, to determine which detected signal is which.

Figure 10:
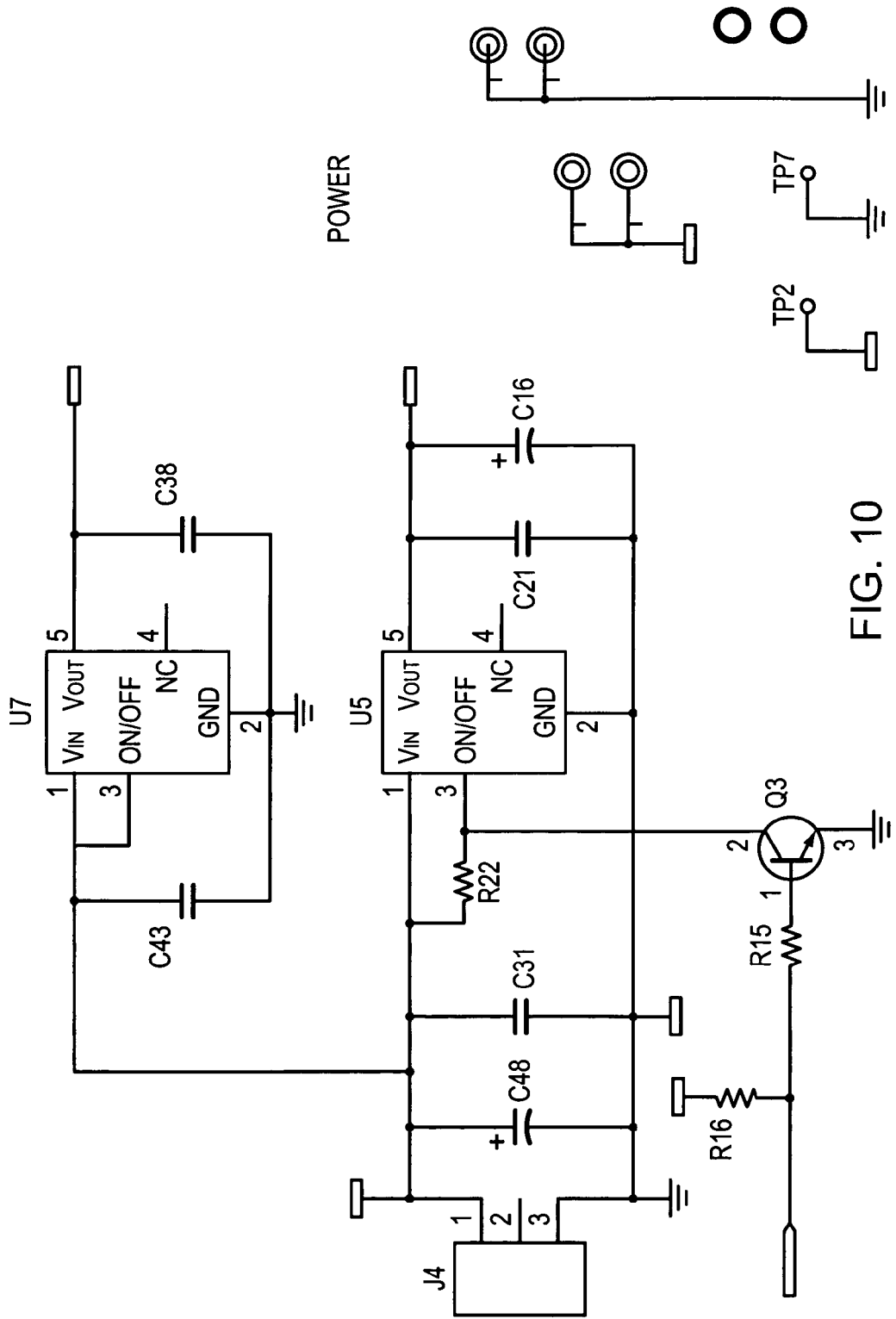

FIGS. 10-14 depict schematic circuit representations in one embodiment of various components of the robot mounted infrared receiver, namely DC-DC linear power converters, a five channel preamplifier, a multiplexer and programmable tuned amplifier, detectors, and a microcontroller and associated peripherals. More specifically, FIG. 10 depicts two independent linear voltage regulators. One of the regulation circuits is switched ON-OFF via microcontroller control, in order to conserve battery power during a sleep mode.

Figure 11A:
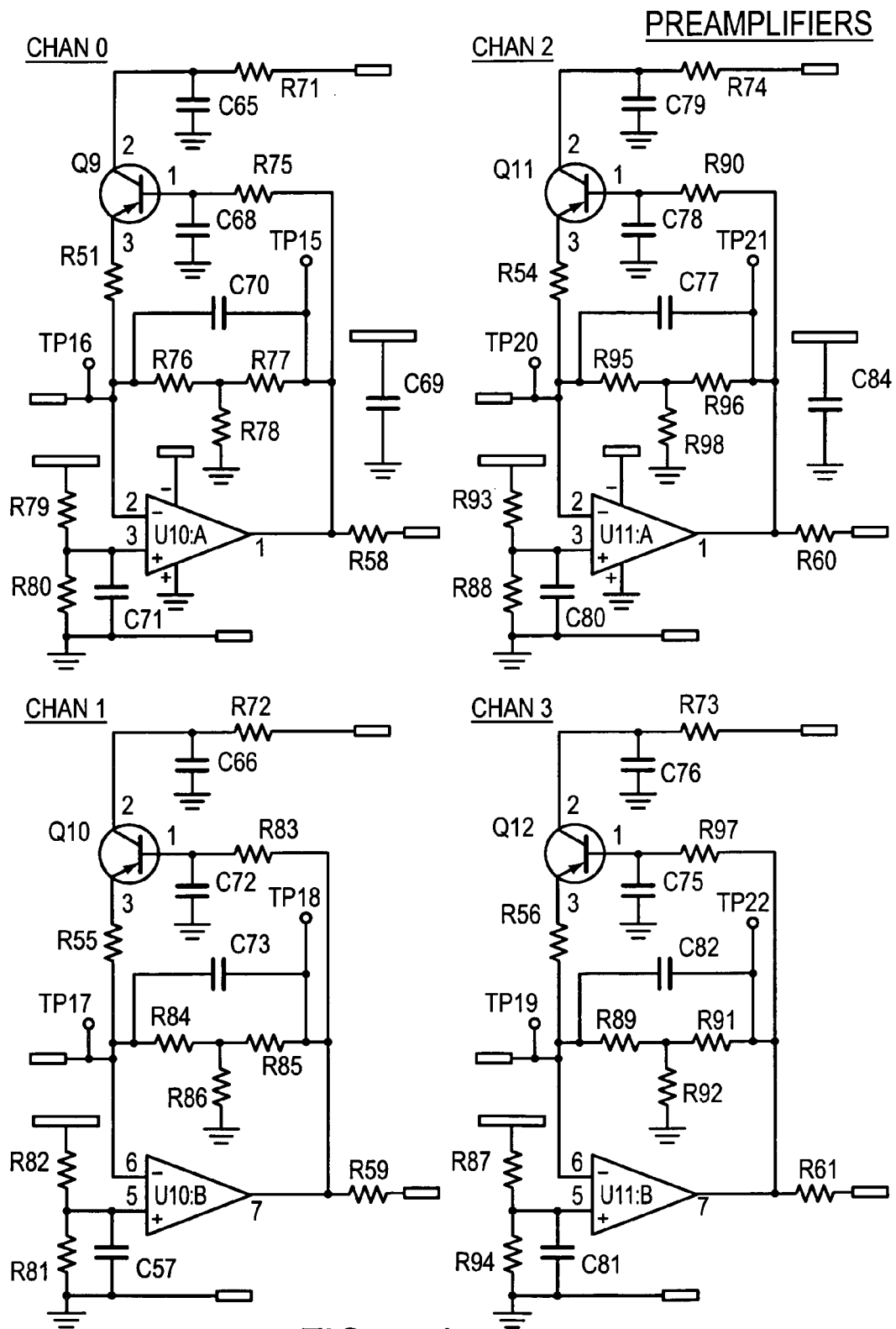
Figure 11B:
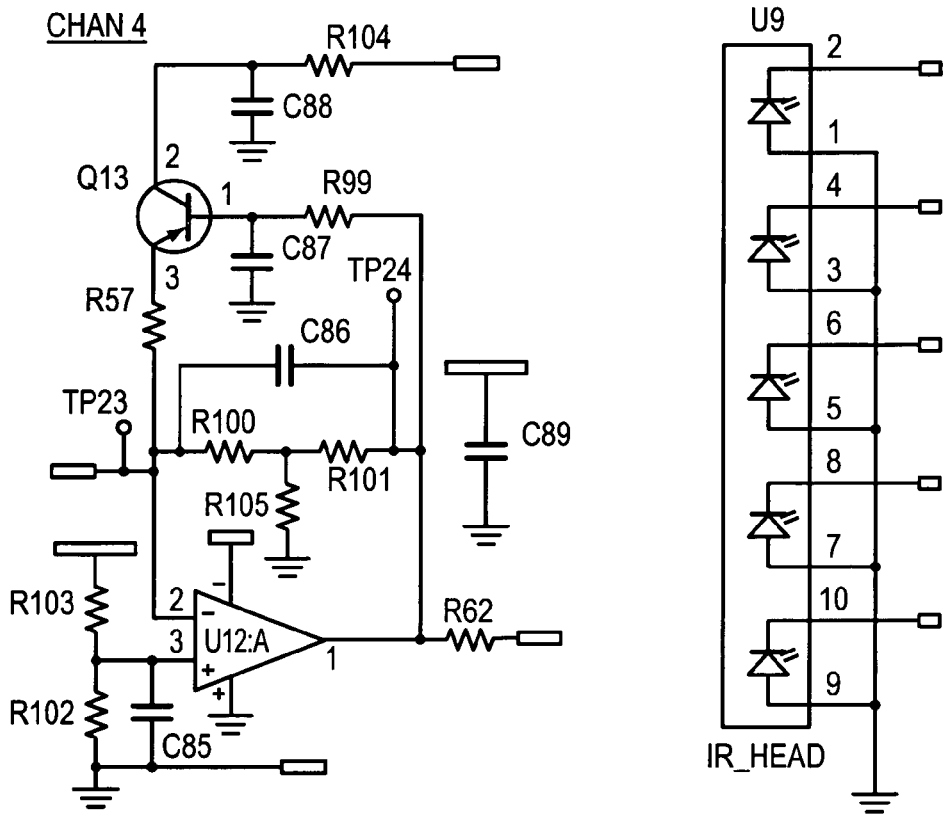
Figure 11B:
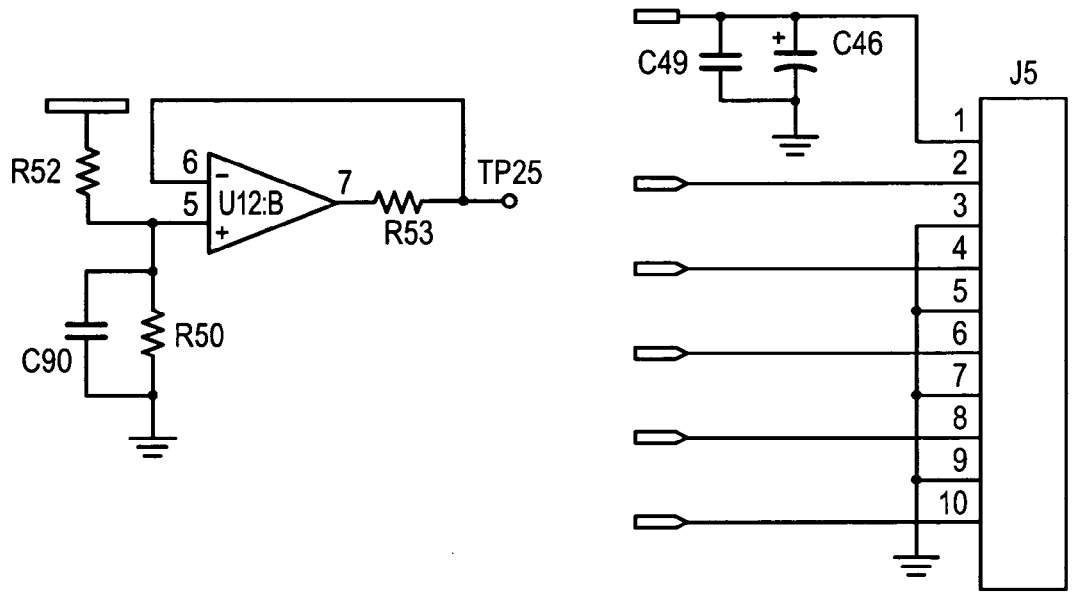

FIG. 11 depicts five independent preamplifiers, that convert respective photodiode output currents into voltages of much larger magnitudes. Each preamplifier is built using an operational amplifier in a transimpedance topology. This is so that the preamplifiers can be configured with low-noise. Also, there is a novel, active feedback circuit, that is used to null out large photodiode current offsets caused by exposure of the circuit to sunlight and other strong low-frequency light sources.

Figure 12:
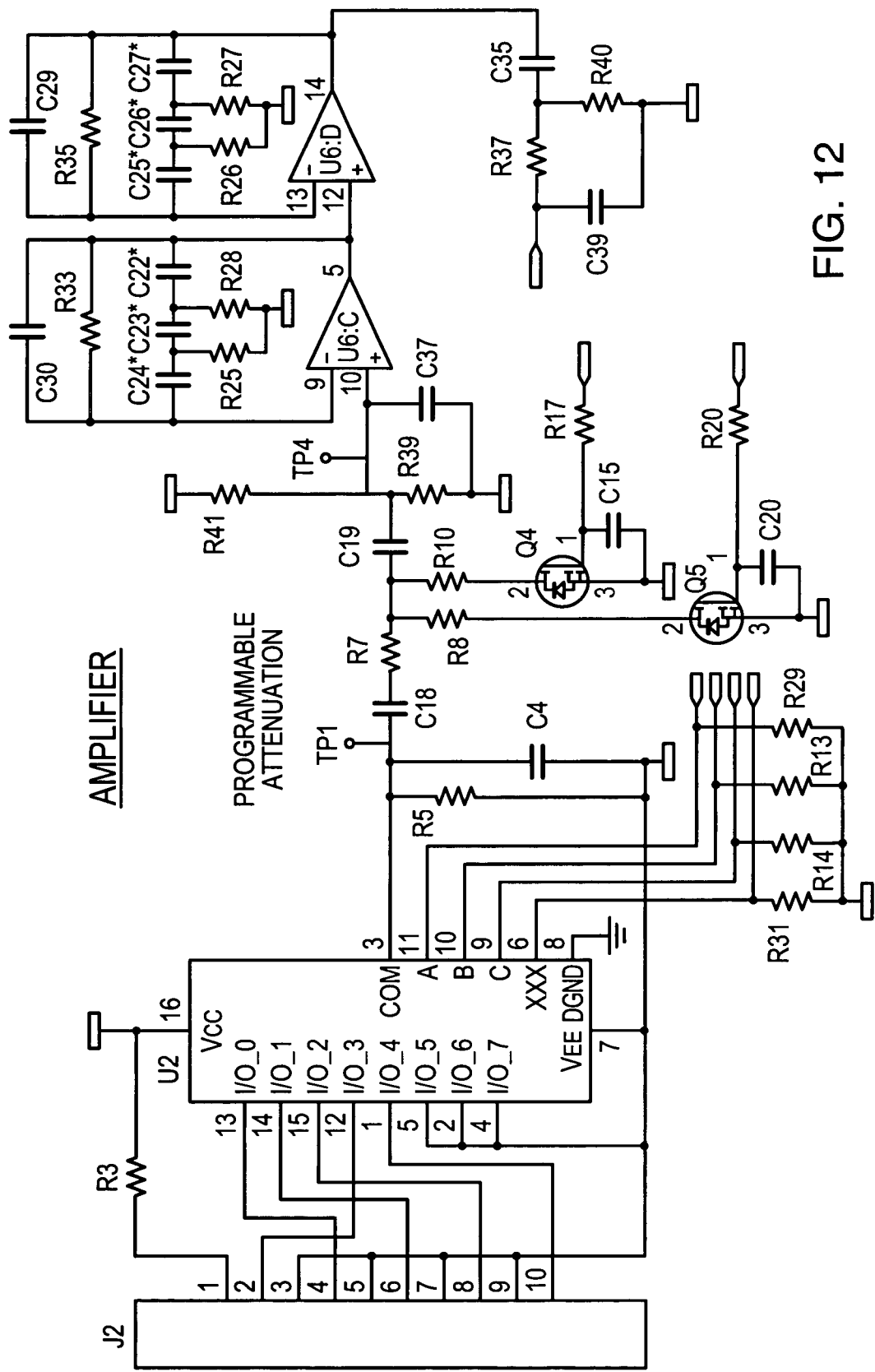

FIG. 12 is a multiplexer and programmable tuned amplifier for the receiver. This circuitry can be functionally segregated into three functional blocks. The first block is a multiplexer, that receives signals from the five photodiode preamplifiers and outputs one of them to a programmable attenuator, as commanded by the receiver's microcontroller. The second block is the programmable attenuator, that is used to reduce the overall receiver gain, to deal with the enormous dynamic range of received signals. As depicted herein, there are two digital inputs from the microcontroller, which permits four discrete gain levels to be selected. The third block is a tuned, band-pass amplifier, that provides the bulk of the voltage amplification to signals which fall within the circuit's passband.

Figure 13:
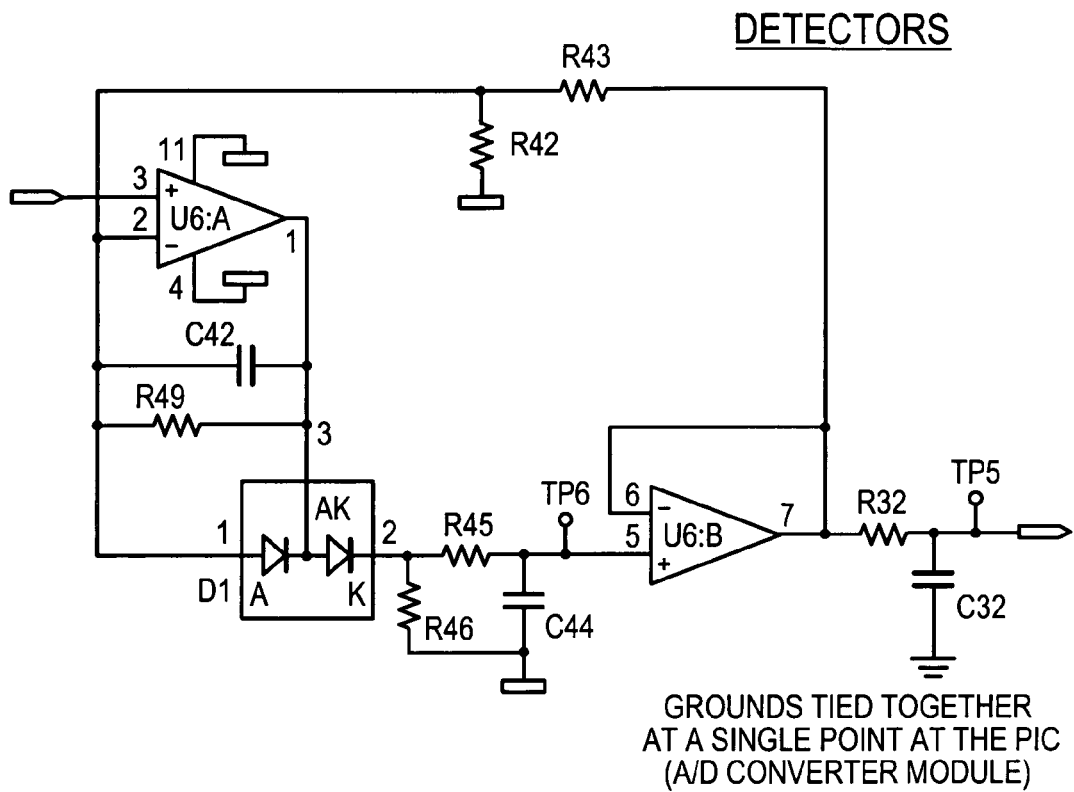
Figure 13:
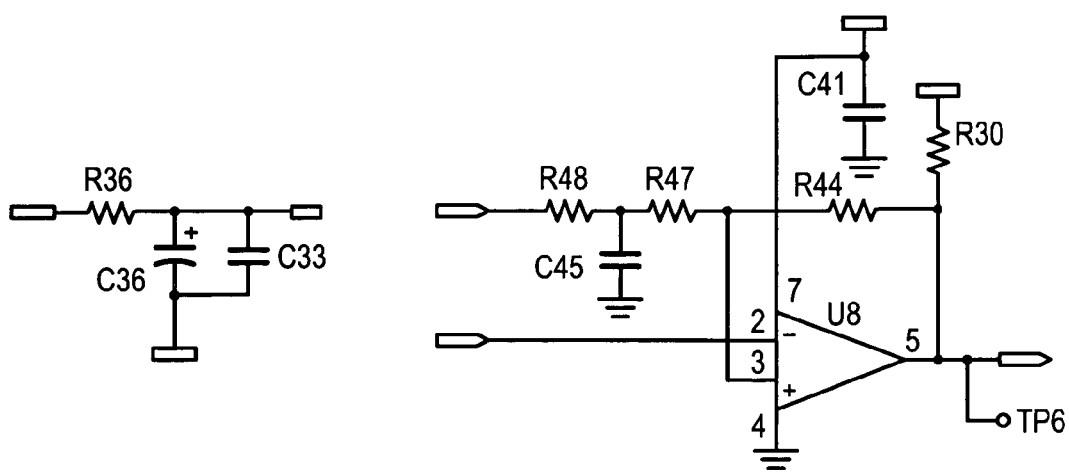

FIG. 13 depicts the two detectors used in the receiver. The first detector is a rectifying, envelope detector with integral voltage gain. This detector is used to strip the modulation frequency and provide the signal envelope to the microcontroller's analog-to-digital converter. The envelope is used the by microcontroller to determine the magnitude of the received signal. The second detector is a voltage comparator, that is used to square up the receive pulses and convert them to CMOS logic level, thereby allowing the microcontroller to extract digital data from the receive signals.

Figure 14:
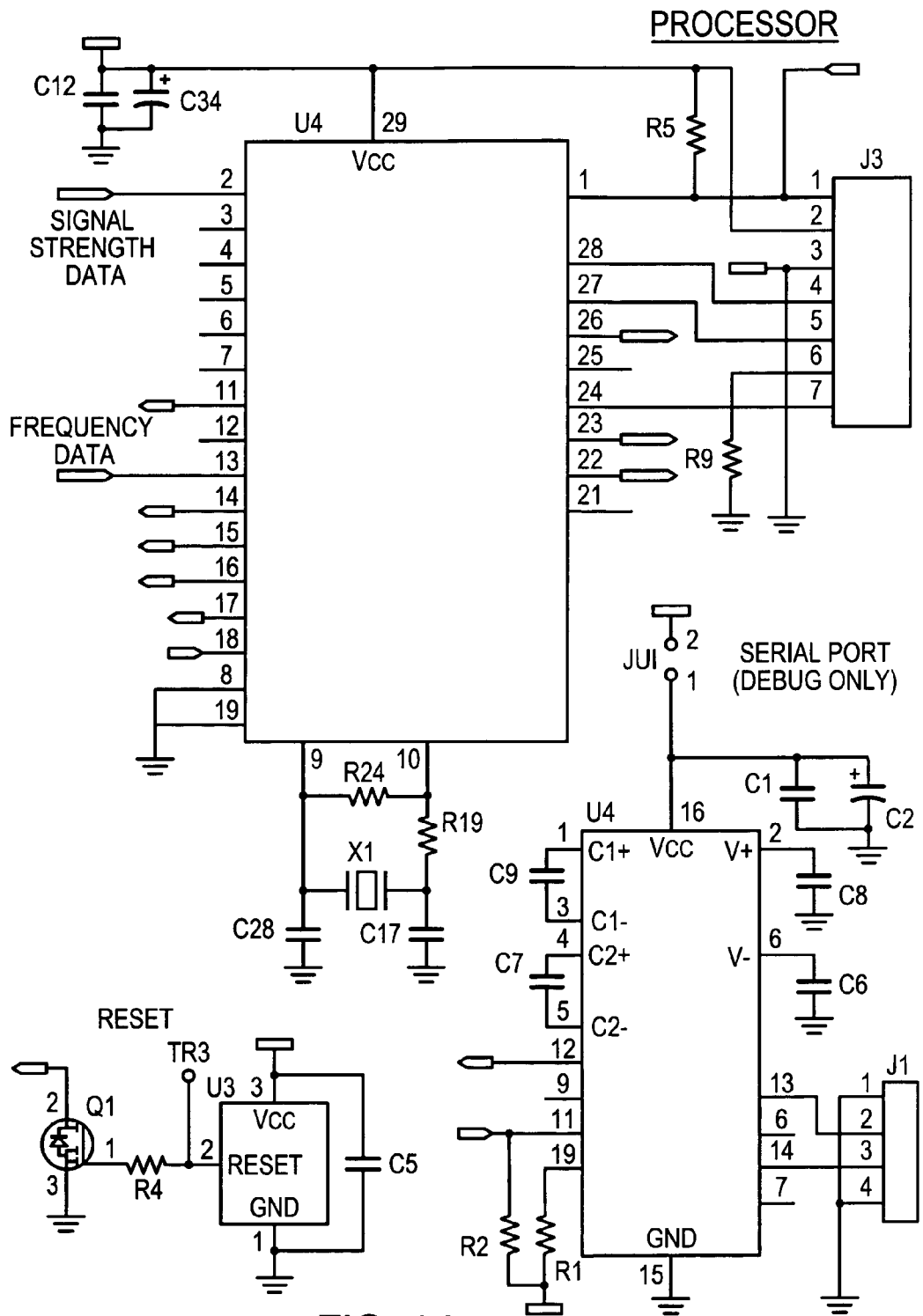

Lastly, FIG. 14 illustrates the microcontroller and its peripherals. The peripherals include a clock oscillator, ICSP port, voltage supervisor/reset generator, and RS-232 level serial port for interfacing with a host personal computer or a main robot processor.

Accordingly, the navigational system is operationally very robust and is adapted to compensate for substantial variances in infrared energy. For example, if the robot is operating in an environment with high base infrared readings (such as a space with a large number of fluorescent lighting fixtures or windows that allow entry of sunlight), the robot distinguishes the infrared signals generated by the transmitter from the infrared noise present in the space. Similarly, the receiver distinguishes between other off-band signals, such as infrared remote controls. In such cases, establishing an initial threshold value of infrared energy and emitting a predefined, known, modulating infrared signal from the transmitter overcomes these disturbances. Additionally, the transmitter can be tuned to emit a sufficiently strong infrared signal to accommodate surfaces with varied reflectivities.

While there have been described herein what are to be considered exemplary and preferred embodiments of the present invention, other modifications of the invention will become apparent to those skilled in the art from the teachings herein. The particular methods, configurations, and geometries disclosed herein are exemplary in nature and are not to be considered limiting.

What is claimed is:

1. A navigational control system for a mobile robot operating within a working area, the navigational control system comprising:
    a transmitter disposed within a working area and comprising a stationary emitter configured to direct first and second signals, modulated to be different from one another, onto a remote surface above the working area, such that the first and second signals are reflected from spaced apart positions on the remote surface; and
    a receiving subsystem disposed on the mobile robot and comprising:
        a receiver installed at a top surface of the mobile robot and directed generally upward, the receiver including at least four discrete photodiodes arranged to face in different directions and configured to generate respective response signals responsive to the reflected signals; and
        a processor connected to the receiver and configured to
            determine a first angle associated with the first reflected signal, from relative amplitudes of the response signals from the photodiodes in response to the first signal as reflected off of the remote surface, to
            determine a second angle associated with the second reflected signal, from relative amplitudes of the response signals from the photodiodes in response to the second signal as reflected off of the remote surface, and to
            determine a location of the robot within the working area relative to the reflected signals, based on the first and second determined angles;
        wherein the photodiodes are angularly spaced to face in different directions about the receiver so as to detect one or both of the reflected signals in various positions within the working area.

2. The navigational control system of claim 1, wherein the emitter sequentially emits the first and second signals as coded signals.

3. The navigational control system of claim 1, wherein the receiver comprises four photodiodes oriented orthogonally to each adjacent photodiode, each photodiode adapted to detect at least one of the first or second signals reflected from the remote surface.

4. The navigational control system of claim 1, wherein the receiver comprises four photodiodes each arranged to at least partially face one of four substantially orthogonal travel directions of the robot.

5. The navigational control system of claim 1, wherein each photodiode is arranged at an angle with respect to an adjacent photodiode.

6. The navigational control system of claim 1, wherein the receiver comprises five photodiodes.

7. The navigational control system of claim 6, wherein the one of the photodiodes is oriented substantially orthogonally to each of the four other photodiodes.

8. The navigational control system of claim 5, wherein at least one of the photodiodes is oriented in a direction corresponding to a reference direction of travel of the robot.

9. The navigational control system of claim 1, wherein the processor further comprises a navigational algorithm.

10. The navigational control system of claim 9, wherein the processor directs a movement of the robot within the working area based on input from the receiver.

11. The navigational control system of claim 1, wherein the processor determines the relative position of the robot at least in part on at least one of an elevation and an azimuth of each detected signal.

12. The navigational control system of claim 1, wherein the transmitter is located on a robot docking station within the working area, and the docking station emitting a signal onto a remote surface above the working area, the receiver being responsive to the emitted docking station signal as reflected off of the remote surface.

13. The navigational control system of claim 1, wherein the at least one signal comprises light having at least one of a visible wavelength and an infrared wavelength.

14. The navigational control system of claim 1, wherein the discrete photodiodes detect the first and second signals emitted by the transmitter as reflected energy bouncing off a diffuse ceiling surface.

15. A method of control for a mobile robot operating within a working area, the method comprising:
   transmitting directed first and second signals, modulated to be different from one another, onto a remote surface above the working area, such that the first and second signals are reflected from spaced apart positions on the remote surface;
   detecting the first and second signals as reflected off of the remote surface using an upwardly directed receiver of the mobile robot, the receiver including at least four discrete photodiodes arranged to face in different directions and configured to generate respective response signals responsive to the reflected signals;
   determining a first angle associated with the first reflected signal, from relative amplitudes of the response signals from the photodiodes in response to the first signal as reflected off of the remote surface;
   determining a second angle associated with the second reflected signal, from relative amplitudes of the response signals from the photodiodes in response to the second signal as reflected off of the remote surface; and
   determining a location of the robot in the working area relative to the reflected signals, based on the first and second determined angles;
   wherein the photodiodes are angularly spaced to face in different directions about the receiver so as to detect one or both of the reflected signals in various positions within the working area.

16. The method of claim 15, further comprising directing a movement of the robot within the working area, the movement based at least in part upon the determined location of the robot within the working area.

17. The method of claim 15, further comprising storing the location of the robot in memory.

18. The method of claim 17, further comprising comparing the location of the robot to a stored location.

19. The method of claim 18, further comprising directing a movement of the robot within the working area, the movement based at least in part on the stored location.

20. The method of claim 15, wherein the location of the robot is based at least in part on at least one of an elevation and an azimuth of the detected signal.

21. The method of claim 17, further comprising creating a map of the working area based on the locations of the robot as the robot maneuvers about the working area.

22. The method of claim 15, further comprising:
   maneuvering the robot away from a base station about a plurality of working areas, each working area having a corresponding transmitter configured to emit a coded signal;
   associating each received coded signal with the corresponding working area;
   storing a travel order of encountered working areas;
   monitoring a power level of the robot;
   when the robot power level is below a threshold power level, maneuvering the robot through the encountered working areas in reverse travel order back to the docking station.

23. The method of claim 22, further comprising maneuvering the robot away from the docking station through the previously encountered working areas according to the travel order.

24. The method of claim 15, further comprising arranging each photodiode of the receiver to at least partially face one of four substantially orthogonal travel directions of the robot.

25. The method of claim 15, further comprising arranging each photodiode of the receiver orthogonally to each adjacent photodiode, each photodiode adapted to detect at least one of the first or second signals reflected from the remote surface.

26. The navigational control system of claim 12, wherein the processor is configured to maneuver the robot in response to the received docking station signal as reflected off of the remote surface.

27. The navigational control system of claim 12, wherein the processor is configured to locate the docking station for docking in response to the received docking station signal as reflected off of the remote surface.

28. The navigational control system of claim 1, wherein the processor executes operations comprising:
   maneuvering the robot away from a docking station about a plurality of working areas, each working area having a corresponding transmitter configured to emit a coded signal, the processor associating the coded signal with the corresponding working area;
   storing a travel order of encountered working areas;
   monitoring a power level of the robot;
   when the robot power level is below a threshold power level, maneuvering the robot through the encountered working areas in reverse travel order back to the docking station.

29. The navigational control system of claim 28, wherein the operations further comprise maneuvering the robot away from the docking station through the previously encountered working areas according to the travel order.

30. The navigational control system of claim 1, wherein the processor is configured to create a map of the working area based on the relative locations of the robot as the robot maneuvers about the working area.

31. The navigational control system of claim 1, wherein the first and second signals are modulated to be different from one another by modulating the signals at different frequencies.

32. The navigational control system of claim 1, wherein the first and second signals are modulated to be different from one another by pulsing the signals with different codes.

33. The method of claim 15, wherein the first and second signals are modulated to be different from one another by modulating the signals at different frequencies.

34. The method of claim 15, wherein the first and second signals are modulated to be different from one another by pulsing the signals with different codes.

35. A mobile robot comprising:

drive components that move the robot within a working area; and a navigational control receiving subsystem comprising:

a receiver installed at a top surface of the mobile robot, the receiver including at least four independent photodiodes arranged to face in different directions and each responsive to first and second reflected signals at spaced apart positions on a remote surface above the working area, the first and second signals modulated to be different from one another; and a processor connected to the receiver and configured to determine a first angle associated with the first reflected signal, by comparing signals from the four independent photodiodes in response to the first reflected signal, to determine a second angle associated with the second reflected signal, by comparing signals from the four independent photodiodes in response to the second reflected signal, and determine a location of the robot within the working area relative to the reflected signals, based on the first and second determined angles;

wherein the at least four independent photodiodes are angularly spaced to face in different directions about the receiver so as to detect one or both of the reflected signals in various positions within the working area.

* * * * *